United States Patent
Ray et al.

(10) Patent No.: US 12,132,932 B2
(45) Date of Patent: Oct. 29, 2024

(54) INTRA PREDICTION USING ENHANCED INTERPOLATION FILTERS

(71) Applicant: QUALCOMM Incorporated, San Diego, CA (US)

(72) Inventors: Bappaditya Ray, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 17/645,024

(22) Filed: Dec. 17, 2021

(65) Prior Publication Data

US 2022/0201329 A1 Jun. 23, 2022

Related U.S. Application Data

(60) Provisional application No. 63/129,437, filed on Dec. 22, 2020.

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
CPC .... H04N 19/11; H04N 19/105; H04N 19/117; H04N 19/157; H04N 19/159; H04N 19/80
See application file for complete search history.

(56) References Cited

U.S. PATENT DOCUMENTS

| 2015/0373325 A1* | 12/2015 | Karczewicz | H04N 19/503 375/240.13 |
| 2018/0367814 A1* | 12/2018 | Seregin | H04N 19/117 |

(Continued)

FOREIGN PATENT DOCUMENTS

| WO | WO-2020004900 A1 * | 1/2020 | H04N 19/105 |
| WO | 2020085955 A1 | 4/2020 | |
| WO | 2020216255 A1 | 10/2020 | |

OTHER PUBLICATIONS

Zhao et al.; "Six tap intra interpolation filter;" Joint Video Exploration Team (JVET) of ITU-T SG 16 WP 3 and ISO/IEC JTC 1/SC 29/ WG 11, 4th Meeting: Chengdu, CN, Oct. 15-21, 2016, JVET-D0119 (Year: 2016).*

(Continued)

*Primary Examiner* — Daniel Chang
(74) *Attorney, Agent, or Firm* — Polsinelli LLP

(57) ABSTRACT

Embodiments include systems and methods of performing intra-prediction using enhanced interpolation filters, including applying variable types and degrees of smoothing based on information such as block size, intra-prediction mode. An encoder or decoder may determine an intra-prediction mode for predicting a block of video data and determine a type of smoothing filter to use for the block of video data. The type of the smoothing filter to be used for performing intra-prediction for the block may be determined based on comparing at least one of a width of the block of video data and a height of the block of video data to a threshold.

16 Claims, 9 Drawing Sheets

(51) Int. Cl.
   *H04N 19/11*   (2014.01)
   *H04N 19/117*  (2014.01)
   *H04N 19/174*  (2014.01)
   *H04N 19/176*  (2014.01)
   *H04N 19/80*   (2014.01)

(52) U.S. Cl.
   CPC ......... *H04N 19/117* (2014.11); *H04N 19/174* (2014.11); *H04N 19/176* (2014.11); *H04N 19/80* (2014.11)

(56) References Cited

U.S. PATENT DOCUMENTS

| | | | |
|---|---|---|---|
| 2020/0007895 A1 | 1/2020 | Van Der Auwera et al. | |
| 2020/0137401 A1* | 4/2020 | Kim | H04N 19/619 |
| 2021/0176492 A1* | 6/2021 | Kim | H04N 19/593 |
| 2022/0182616 A1* | 6/2022 | Li | H04N 19/105 |
| 2022/0337814 A1* | 10/2022 | Heo | H04N 19/117 |
| 2022/0345701 A1* | 10/2022 | Yang | H04N 19/82 |

OTHER PUBLICATIONS

Chang Y-J., et al., "Compression Efficiency Methods Beyond VVC", 21st JVET Meeting, JVET of ITU-T SG 16 WP 3 and ISO/IEC JTC1/SC29/WG11, No. JVET-U0100, by teleconference, Jan. 6-15, 2021, Dec. 31, 2020, XP030293237, Jan. 11, 2021-Jan. 15, 2021, Online, 133rd MPEG Meeting, (Motion Picture Expert Group or ISO/IEC JTC1/SC29/WG11), No. m55890, XP030290689, pp. 1-13, https://jvet-experts.org/doc_end_user/documents/21_Teleconference/wg11/JVET-U0100-v1.zip.

International Search Report and Written Opinion—PCT/US2021/073040—ISA/EPO—Jun. 10, 2022.

Partial International Search Report—PCT/US2021/073040—ISA/EPO—Apr. 19, 2022.

* cited by examiner

INTRA PREDICTION USING ENHANCED INTERPOLATION FILTERS

CROSS-REFERENCE TO RELATED APPLICATIONS

This application claims the benefit of U.S. Provisional Application No. 63/129,437, filed Dec. 22, 2020, which is hereby incorporated by reference, in its entirety and for all purposes.

FIELD

This application is related to video coding (e.g., including encoding and/or decoding of video data). For example, aspects of the application relate to systems and techniques for performing intra prediction using enhanced interpolation filters.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include versatile video coding (VVC), high-efficiency video coding (HEVC), advanced video coding (AVC), MPEG-2 Part 2 coding (MPEG stands for moving picture experts group), among others, as well as proprietary video codecs/formats such as AOMedia Video 1 (AV1) developed by the Alliance for Open Media. Video coding generally utilizes prediction methods (e.g., inter-prediction, intra-prediction, or the like) that take advantage of redundancy present in video images or sequences. A goal of video coding techniques is to compress video data into a form that uses a lower bit rate, while avoiding or minimizing degradations to video quality. With ever-evolving video services becoming available, encoding techniques with better coding efficiency are needed.

SUMMARY

In some examples, systems and techniques are described for performing intra-prediction using enhanced interpolation filters, which can apply variable types and degrees of smoothing based on information such as block size, intra-prediction mode, among others. According to at least one illustrative example, a method is provided for processing video data. The method includes: determining an intra-prediction mode for predicting a block of video data; determining a type of smoothing filter to use for the block of video data, wherein the type of the smoothing filter is determined based at least in part on comparing at least one of a width of the block of video data and a height of the block of video data to a first threshold; and performing intra-prediction for the block of video data using the determined type of smoothing filter and the intra-prediction mode.

In another example, an apparatus for processing video data is provided that includes at least one memory (e.g., configured to store data, such as virtual content data, one or more images, etc.) and at least one processors (e.g., implemented in circuitry) coupled to the at least one memory. The one or more processors are configured to and can: determine an intra-prediction mode for predicting a block of video data; determine a type of smoothing filter to use for the block of video data, wherein the type of the smoothing filter is determined based at least in part on comparing at least one of a width of the block of video data and a height of the block of video data to a first threshold; and perform intra-prediction for the block of video data using the determined type of smoothing filter and the intra-prediction mode.

In another example, a non-transitory computer-readable medium is provided that has stored thereon instructions that, when executed by one or more processors, cause the one or more processors to: determine an intra-prediction mode for predicting a block of video data; determine a type of smoothing filter to use for the block of video data, wherein the type of the smoothing filter is determined based at least in part on comparing at least one of a width of the block of video data and a height of the block of video data to a first threshold; and perform intra-prediction for the block of video data using the determined type of smoothing filter and the intra-prediction mode.

In another example, an apparatus for processing video data is provided. The apparatus includes: means for determining an intra-prediction mode for predicting a block of video data; means for determining a type of smoothing filter to use for the block of video data, wherein the type of the smoothing filter is determined based at least in part on comparing at least one of a width of the block of video data and a height of the block of video data to a first threshold; and means for performing intra-prediction for the block of video data using the determined type of smoothing filter and the intra-prediction mode.

In some aspects, the process, apparatuses, and computer-readable medium can further include: using a first smoothing interpolation filter as the determined type of smoothing filter based at least in part on a determination that at least one of the width of the block and the height of the block is greater than the first threshold; and determining, using the first smoothing interpolation filter, a reference pixel for intra-prediction of the block of video data.

In some aspects, the first smoothing interpolation filter includes a 6 tap Gaussian filter.

In some aspects, the process, apparatuses, and computer-readable medium can further include: using a second smoothing interpolation filter as the determined type of smoothing filter based at least in part on a determination that at least one of the width of the block and the height of the block is not greater than the first threshold; and determining, using the second smoothing interpolation filter, a reference pixel for intra-prediction of the block of video data.

In some aspects, the second smoothing interpolation filter includes a 4 tap Gaussian filter.

In some aspects, the process, apparatuses, and computer-readable medium can further include: determining a minimum offset between an angular direction of the intra-prediction mode and one of a vertical intra-prediction mode and a horizontal intra-prediction mode; and determining the type of smoothing filter to use for the block of video data based on comparing the determined minimum offset to a second threshold.

In some aspects, the process, apparatuses, and computer-readable medium can further include: determining a low-pass filter as the type of smoothing filter based at least in part on a determination that the determined minimum offset is greater than the second threshold and a determination that the intra-prediction mode is an integer angled mode associated with an integer-valued reference pixel position.

In some aspects, the low-pass filter performs reference pixel smoothing without interpolation, the low-pass filter including a [1 2 1] filter.

In some aspects, the process, apparatuses, and computer-readable medium can further include: determining a Gaussian filter as the type of smoothing filter based at least in part on a determination that the determined minimum offset is greater than the second threshold and a determination that the intra-prediction mode is a fractional angled mode associated with a fractional-valued reference pixel position.

In some aspects, the Gaussian filter performs smoothing interpolation without reference pixel smoothing.

In some aspects, the Gaussian filter includes a 6 tap Gaussian filter based on a determination that at least one of the width of the block and the height of the block are greater than the first threshold.

In some aspects, the Gaussian filter includes a 4 tap Gaussian filter based on a determination that at least one of the width of the block and the height of the block are not greater than the first threshold.

In some aspects, the process, apparatuses, and computer-readable medium can further include, based at least in part on a determination that the determined minimum offset is not greater than the second threshold: using an interpolation filter as the determined type of smoothing filter, wherein the interpolation filter includes a 4 tap cubic filter; and performing intra-prediction for the block of video data using the interpolation filter without applying reference pixel smoothing.

In some aspects, the process, apparatuses, and computer-readable medium can further include: determining a low-pass filter as the type of smoothing filter based at least in part on a determination that the intra-prediction mode is an integer angled mode and a determination that the determined minimum offset is greater than the second threshold.

In some aspects, the process, apparatuses, and computer-readable medium can further include: performing reference pixel smoothing using a large tap low-pass filter based at least in part on a determination that at least one of the width of the block and the height of the block is greater than the first threshold, wherein the large tap low-pass filter applies a greater degree of reference pixel smoothing than a small tap low-pass filter.

In some aspects, the process, apparatuses, and computer-readable medium can further include: performing reference pixel smoothing using a small tap low-pass filter based at least in part on a determination that at least one of the width of the block and the height of the block is not greater than the first threshold, wherein the small tap low-pass filter applies a lesser degree of reference pixel smoothing than a large tap low-pass filter.

In some aspects, the process, apparatuses, and computer-readable medium can further include: determining that the intra-prediction mode is an integer-angled mode based at least in part on comparing a slope of the intra-prediction mode to one or more pixel positions determined from the width of the block and the height of the block.

In some aspects, the process, apparatuses, and computer-readable medium can further include: determining that an offset between an angular direction of the intra-prediction mode and a vertical intra-prediction mode or a horizontal intra-prediction mode is less than a second threshold; and performing intra-prediction for the block of video data using a cubic interpolation filter based on determining that the offset between the angular direction of the intra-prediction mode and the vertical intra-prediction mode or the horizontal intra-prediction mode is less than the second threshold.

In some aspects, the process, apparatuses, and computer-readable medium can further include performing reference line extension using a weak interpolation filter, wherein: the weak interpolation filter is used to perform the reference line extension prior to use of the cubic interpolation filter to perform intra-prediction; and the cubic interpolation filter has a higher cutoff frequency than the weak interpolation filter and applies a greater degree of smoothing than the weak interpolation filter.

In some aspects, the weak interpolation filter includes a 4 tap sinc-based interpolation filter and a 6-bit 4 tap interpolation filter.

In some aspects, the type of smoothing filter is signaled in a video bitstream.

In some aspects, the type of smoothing filter is signaled for individual ones of a set of prediction blocks, coding blocks, coding tree units (CTUs), slices, or sequences.

In some aspects, the process, apparatuses, and computer-readable medium can further include: determining the type of smoothing filter based on at least one of the width and the height of the block without using information explicitly signaled in a video bitstream.

In some aspects, the process, apparatuses, and computer-readable medium can further include: determining a block of residual data for the block of video data; and decoding the block of video data using the block of residual data and a predictive block determined based on performing the intra-prediction for the block of video data.

In some aspects, the process, apparatuses, and computer-readable medium can further include: generating an encoded video bitstream including information associated with the block of video data.

In some aspects, the process, apparatuses, and computer-readable medium can further include storing the encoded video bitstream (e.g., in the at least one memory of the apparatus).

In some aspects, the process, apparatuses, and computer-readable medium can further include transmitting the encoded video bitstream (e.g., using a transmitter of the apparatus).

In some aspects, each of the apparatuses described above can be or can be part of a mobile device (e.g., a mobile telephone or so-called "smart phone", a tablet computer, or other type of mobile device), a network-connected wearable device, an extended reality device (e.g., a virtual reality (VR) device, an augmented reality (AR) device, or a mixed reality (MR) device), a personal computer, a laptop computer, a server computer (e.g., a video server or other server device), a television, a vehicle (or a computing device or system of a vehicle), a camera (e.g., a digital camera, an Internet Protocol (IP) camera, etc.), a multi-camera system, a robotics device or system, an aviation device or system, or other device. In some aspects, each of the apparatuses can include at least one camera for capturing one or more images or video frames. For example, each of the apparatuses can include a camera (e.g., an RGB camera) or multiple cameras for capturing one or more images and/or one or more videos including video frames. In some aspects, each of the apparatuses can include a display for displaying one or more images, videos, notifications, or other displayable data. In some aspects, each of the apparatuses can include a transmitter configured to transmit one or more video frame and/or syntax data over a transmission medium to at least one device. In some aspects, each of the apparatuses can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
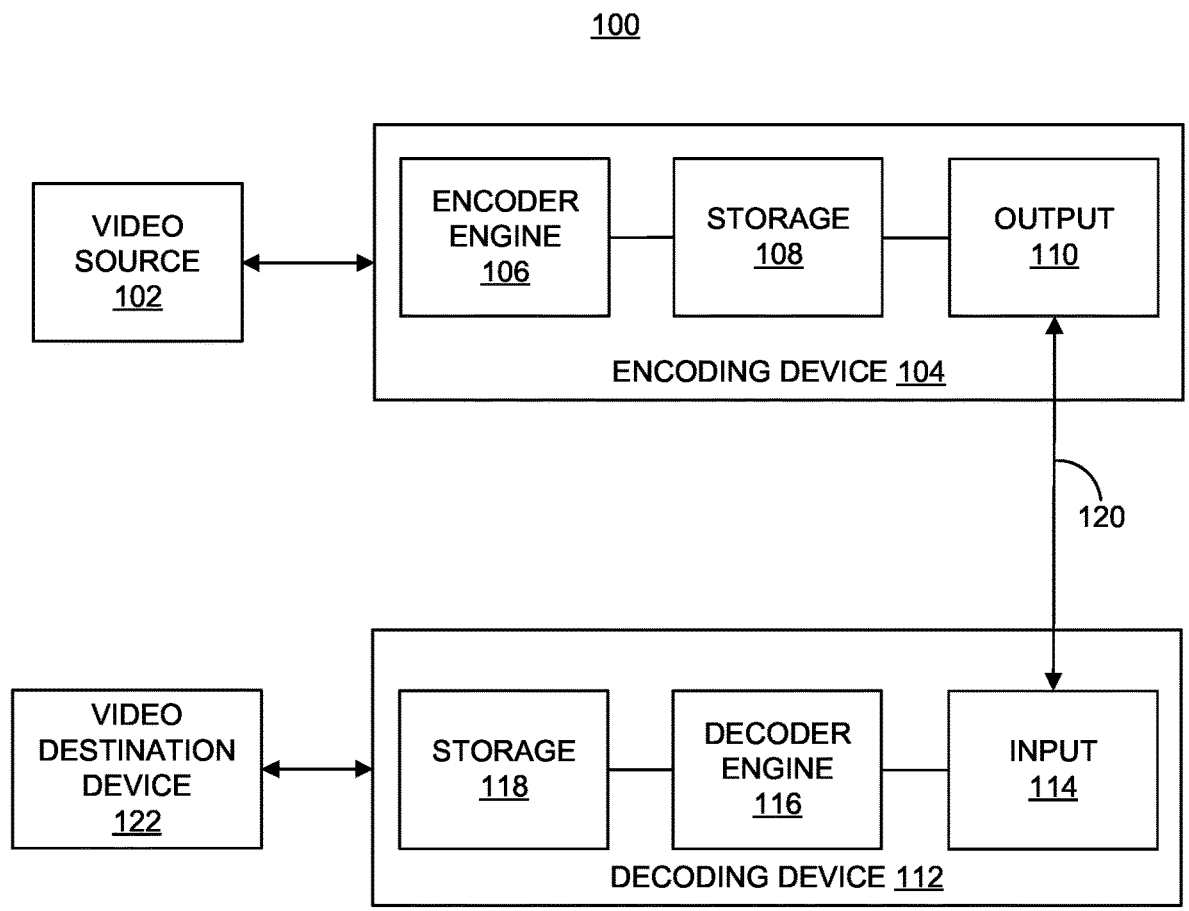
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy encode the quantized transform coefficients and/or the syntax elements, thereby further reducing the number of bits needed for their representation.

After entropy decoding and de-quantizing the received bitstream, a video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

Video coding can be performed according to a particular video coding standard. Examples of video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual, Advanced Video Coding (AVC) or ITU-T H.264, including its Scalable Video Coding (SVC) and Multiview Video Coding (MVC) extensions, High Efficiency Video Coding (HEVC) or ITU-T H.265, including its range and screen content coding, 3D video coding (3D-HEVC), multiview (MV-HEVC), and scalable (SHVC) extensions, Versatile Video Coding (VVC) or ITU-T H.266 and its extensions, VP9, Alliance of Open Media (AOMedia) Video 1 (AV1), Essential Video Coding (EVC), among others.

As noted above, a video encoder can partition each picture of an original video sequence into one or more smaller blocks or rectangular regions, which may then be encoded using, for example, intra-prediction (or intra-frame prediction) to remove spatial redundancy inherent to the original video sequence. If a block is encoded in an intra-prediction mode, a prediction block is formed based on previously encoded and reconstructed blocks, which are available in both the video encoder and the video decoder to form a prediction reference. For example, the spatial prediction of the pixel values inside of a current block (e.g., currently encoded or currently decoded) can be determined using the pixel values of the adjacent, previously encoded blocks. These pixel values are used as reference pixels. The reference pixels can be organized into one or more reference pixel lines and/or reference pixel groups. In some examples, intra-prediction can be applied for both luma and chroma components of a block.

A number of different intra-prediction modes can be utilized to provide different spatial prediction techniques to form a predicted reference or predicted block based on the data from previously encoded neighboring blocks within the same picture (e.g., from the reference pixels). Intra-prediction modes can include planar and DC modes and/or directional intra-prediction modes (also referred to as "regular intra-prediction modes"). In some examples, a single planar intra-prediction and a single DC intra-prediction mode can be used, along with multiple directional intra-prediction modes. Intra-prediction modes describe different variants or approaches for calculating pixel values in the area being coded based on reference pixel values. In an illustrative example, the HEVC standard provides 33 directional intra-prediction modes. In another illustrative example, VVC and/or VVC Test Model 5 (VTM5) extend the HEVC directional intra-prediction modes to provide a total of 93 directional intra-prediction modes.

At a video decoder, the choice of intra-prediction mode for each encoded block (e.g., the choice of intra-prediction mode made by the video encoder when generating the encoded block) can be determined by the decoder (e.g., derived) or can be signaled to the video decoder. For example, in some cases, intra-prediction modes between neighboring blocks may be correlated (e.g., if two adjacent, previously encoded blocks were predicted using intra-prediction mode 2 then it is likely that the best intra-prediction mode for the current block is also intra-prediction mode 2). In some examples, for each current block, the video encoder and the video decoder can calculate the most probable intra-prediction mode. The video encoder may also signal an intra-prediction mode to the video decoder (e.g., using flags, mode parameters, mode selectors, etc.).

In the current VVC standard, 93 directional intra-prediction modes are provided, as was mentioned previously. Each intra-prediction mode is associated with a different angular direction, such that the intra-prediction modes are unique and non-overlapping. Directional intra-prediction modes can be classified as either integer angled modes or fractional (non-integer angled) modes. For a given block of video data, an integer angled intra-prediction mode has a reference pixel at an integer position, e.g., the integer angled intra-prediction mode has a slope that passes through the position of a reference pixel located at the perimeter of the currently coded block. In comparison, a fractional intra-prediction mode does not have a reference pixel at an integer position, an instead has a slope that passes through a point somewhere between two adjacent reference pixels (e.g., a slope of a pixel at a fractional position i+f (i: integer part, f: fractional part) passes through a pixel i and a pixel i+1).

According to the VVC standard, one or more smoothing filters and/or operations can be applied to the reference pixels based on the intra-prediction mode. By smoothing or filtering the reference pixels, a more accurate intra-prediction result may be obtained, as intra-prediction results are calculated from the smoothed reference pixels. In some examples, reference pixel smoothing can be performed for both fractional intra-prediction modes and integer (e.g., integer-slope) intra-prediction modes. In addition to smoothing filters for reference pixel smoothing, the VVC standard also specifies the utilization of one or more interpolation filters. In some examples, smoothing can be performed by smoothing the reference pixels directly. In some examples, a smoothing operation can be combined with or performed in conjunction with an interpolation operation (e.g., by applying a smoothing interpolation filter).

For example, interpolation filters can be used to perform interpolation for fractional intra-prediction modes. Fractional intra-prediction modes have non-integer value slopes and therefore are associated with fractional reference pixel positions (e.g., at a position between adjacent reference pixels). Intra-prediction for fractional intra-prediction modes can therefore interpolate between values of adjacent reference pixels to calculate an interpolated value for the fractional reference pixel position. In some scenarios, the majority of the directional intra-prediction modes may be fractional (e.g., non-integer) modes. For instance, in the VVC standard, intra-prediction modes −14, −12, −10, −6, 2, 18, 34, 50, 66, 72, 76, 78, and 80 may be integer intra-prediction modes (also referred to as "integer-slope modes"), with the remaining modes of the 93 directional intra-prediction modes being fractional intra-prediction modes.

The VVC standard specifies the use of a fixed degree of smoothing for all block sizes. For example, according to the VVC standard, a coding device (e.g., a video encoding device and/or a video decoding device) can use a 4 tap Gaussian interpolation filter and/or a [1 2 1] low-pass filter for all block sizes. In some cases, the use of a fixed degree of smoothing (e.g., a 4 tap Gaussian interpolation filter and/or a [1 2 1] low-pass filter for all block sizes) for all block sizes can lead to decreases in intra-prediction performance. For example, larger block sizes (e.g., blocks with a width and/or height of 16 or more samples) can benefit from a higher degree of smoothing than smaller block sizes (e.g., blocks with a width and/or height of less than 16 samples). Large and small block sizes can be encountered when performing intra-prediction according to the VVC standard, as the block partitioning scheme in VVC permits different block size(s) based on different inputs, parameters, and other analytical factors. In some cases, larger block sizes can be associated with portions of the original video sequence image that already include relatively smooth edges and/or a relatively low number of features. Small block sizes can be associated with portions of the original video sequence image that contain a relatively high number of features, directions, etc.

Because the creation of a larger block size is often associated with the presence of relatively smooth video data within the block, intra-prediction of larger block sizes can in some examples benefit from having a higher degree of smoothing applied while intra-prediction of smaller block sizes can benefit from having a lesser degree of smoothing applied.

As described in more detail herein, systems, apparatuses, methods, and computer-readable media (collectively referred to as "systems and techniques") are described herein for providing improved intra-prediction. For example, as described in more detail herein, the systems and techniques can perform intra-prediction using multiple smoothing and/or interpolation filters, each having a different degree of smoothing and/or filtering. According to some aspects, the systems and techniques can include selecting one or more smoothing and interpolation filters (and an associated type of smoothing and/or associated degree of smoothing) based on a size of the currently coded block. For example, one or more of the width of the block and the height of the block can be compared to a pre-determined threshold, with smaller blocks (e.g., blocks with a width and/or height that is less than the threshold) receiving a different degree or smoothing than larger blocks (e.g., blocks with a width and/or height that is greater than the threshold).

In some examples, smoothing and/or interpolation filters can additionally, or alternatively, be selected based on the intra-prediction mode being used for a picture or a portion of the picture (e.g., a block, a slice, etc.). Relationships between a specific intra-prediction mode and a smoothing or interpolation filter can be determined in advance and/or determined in real-time (e.g., as a picture, block, slice, etc. is being encoded or decoded). In an illustrative example, the intra-prediction mode of the currently coded block can be compared to a vertical intra-prediction mode and a horizontal intra-prediction mode, in order to determine a minimum distance (e.g., angular distance or offset) between the current block intra-prediction mode and one of the vertical and horizontal intra-prediction modes. The minimum distance can be compared to a pre-determined threshold (defined in the VVC standard, in some examples) in order to determine whether or not smoothing and/or filtering should be applied to the currently coded block. In some examples, the variable smoothing of reference pixels with block level switching, as described herein, can provide enhanced intra-prediction, as will be described in greater depth below.

Further details regarding the systems and techniques will be described with respect to the figures.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, the system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

VVC, a latest video coding standard, was developed by Joint Video Experts Team (JVET) of ITU-T and ISO/IEC to, at least in part, achieve substantial compression capability beyond HEVC for a broad range of applications. The VVC specification was finalized in July 2020 and published by both ITU-T and ISO/IEC. The VVC specification specifies normative bitstream and picture formats, high level syntax (HLS) and coding unit level syntax, the parsing process, the decoding process, etc. VVC also specifies profiles/tiers/levels (PTL) restrictions, byte stream format, hypothetical reference decoder, and supplemental enhancement information (SEI) in the annex.

The systems and techniques described herein can be applied to any of the existing video codecs (e.g., VVC, HEVC, AVC, or other suitable existing video codec), and/or can be an efficient coding tool for any video coding standards being developed and/or future video coding standards. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random-access point picture in the base layer and with certain properties up to and not including a next AU that has a random-access point picture in the base layer and with certain properties. For example, the certain properties of a random-access point picture that starts a CVS may include a RASL flag (e.g., NoRaslOutputFlag) equal to 1. Otherwise, a random-access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 106.

Once the pictures of the video data are partitioned into CUs, the encoder engine 106 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and the decoder engine 116 (described in more detail below) may be configured to operate according to VVC. According to VVC, a video coder (such as the encoder engine 106 and/or the decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, encoding device 104 and decoding device 112 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Encoding device 104 may further partition a superblock into smaller coding blocks. Encoding device 104 may partition a superblock and other coding blocks into smaller blocks using square or non-square partitioning. Non-square blocks may include N/2×N, N×N/2, N/4×N, and N×N/4 blocks. Encoding device 104 and decoding device 112 may perform separate prediction and transform processes on each of the coding blocks.

AV1 also defines a tile of video data. A tile is a rectangular array of superblocks that may be coded independently of other tiles. That is, encoding device 104 and decoding device 112 may encode and decode, respectively, coding blocks within a tile without using video data from other tiles. However, encoding device 104 and decoding device 112 may perform filtering across tile boundaries. Tiles may be uniform or non-uniform in size. Tile-based coding may enable parallel processing and/or multi-threading for encoder and decoder implementations.

In some examples, the encoding device 104 and decoding device 112 can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The encoding device 104 and decoding device 112 can be configured to use quadtree partitioning per HEVC, QTBT partitioning, MTT partitioning, or other partitioning structures.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There is a plurality of intra-prediction modes (also referred to as "intra modes"). In some examples, the intra prediction of a luma block includes 35 modes, including the Planar mode, DC mode, and 33 angular modes (e.g., diagonal intra-prediction modes and angular modes adjacent to the diagonal intra-prediction modes). The encoding device 104 and/or the decoding device 112 may select the prediction mode for each block that minimizes the residual between the prediction block and the block to be encoded (e.g., based on a Sum of Absolute Errors (SAE), Sum of Absolute Differences (SAD), Sum of Absolute Transformed Differences (SATD), or other measure of similarity). For instance, the SAE can be calculated by taking the absolute difference between each pixel (or sample) in the block to be encoded and the corresponding pixel (or sample) in the prediction block being used for comparison. The differences of the pixels (or samples) are summed to create a metric of block similarity, such as the L1 norm of the difference image, the Manhattan distance between two image blocks, or other calculation. Using SAE as an example, the SAE for each prediction using each of the intra-prediction modes indicates the magnitude of the prediction error. The intra-prediction mode that has the best match to the actual current block is given by the intra-prediction mode that gives the smallest SAE.

The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra-prediction mode and associated names

| Intra-prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

To perform Planar prediction for an N×N block, for each sample $p_{xy}$ located at (x, y), the prediction sample value may be calculated by applying a bilinear filter to four specific neighboring reconstructed samples (used as reference samples for intra prediction). The four reference samples include the top-right reconstructed sample TR, the bottom-left reconstructed sample BL, and the two reconstructed samples located at the same column ($r_{x,-1}$) and row ($r_{-1,y}$) of the current sample. The Planar mode can be formulated as below:

$$p_{xy}=((N-x1)*L+(N-y1)*T+x1*R+y1*B)/(2*N),$$

where x1=x+1, y1=y+1, R=TR and B=BL.

For DC mode, the prediction block is filled with the average value of the neighboring reconstructed samples. Generally, both Planar and DC modes are applied for modeling smoothly varying and constant image regions.

Figure 2A:
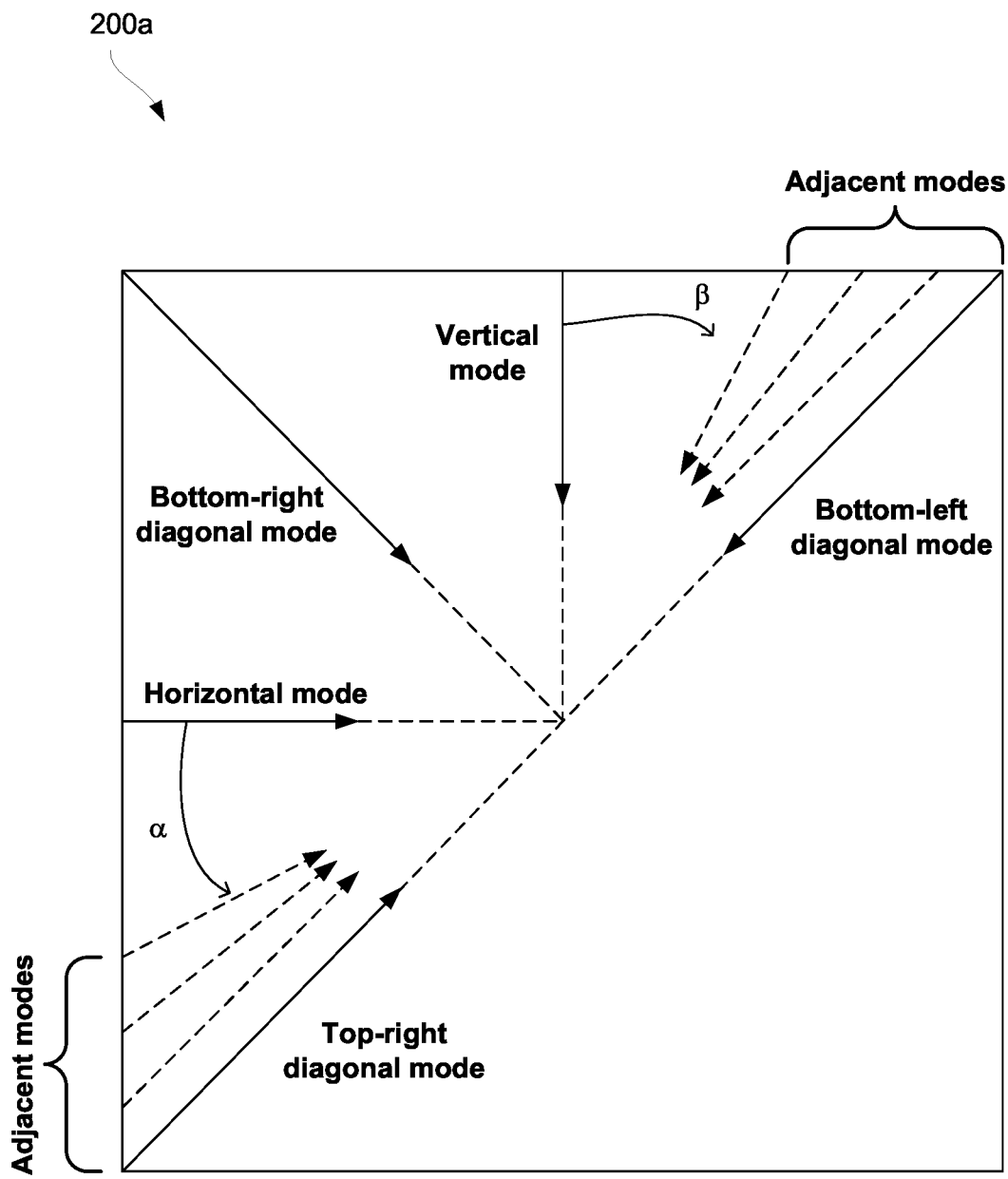
FIG. 2A is a diagram illustrating an example of angular prediction modes, in accordance with some examples.

For angular intra-prediction modes in HEVC, which include 33 different prediction directions, the intra prediction process can be described as follows. For each given angular intra-prediction mode, the intra-prediction direction can be identified accordingly; for example, intra mode 18 corresponds to a pure horizontal prediction direction, and intra mode 26 corresponds to a pure vertical prediction direction. Angular prediction modes are shown in the example diagram 200a of FIG. 2A. In some codecs, a different number of intra-prediction modes may be used. For example, in addition to Planar and DC modes, 93 angular modes may be defined, where mode 2 indicates a prediction direction of −135°, mode 34 indicates a prediction direction of −45°, and mode 66 indicates a prediction direction of 45°. In some codecs (e.g., VVC), angles beyond −135° (less than)−135° and beyond 45° (more than 45°) may also be defined; these may be referred to as wide-angled intra modes. Although the description herein is with respect to the intra mode design in HEVC (i.e., with 35 modes), the techniques disclosed may also apply to more intra modes (e.g., the intra modes defined by VVC or other codec).

Coordinates (x,y) of each sample of a prediction block are projected along a specific intra prediction direction (e.g., one of the angular intra-prediction modes). For example, given a specific intra prediction direction, the coordinates (x, y) of a sample of the prediction block are first projected to the row/column of neighboring reconstructed samples along the intra prediction direction. In cases when (x,y) is projected to the fractional position a between two neighboring reconstructed samples L and R; then the prediction value for (x, y) may be calculated using a two-tap bi-linear interpolation filter, formulated as follows:

$$p_{xy}=(1-a)\cdot L+a\cdot R$$

To avoid floating point operations, in HEVC, the above calculation may be approximated using integer arithmetic as:

$$p_{xy}=((32-a')\cdot L+a'\cdot R+16)>>5,$$

where a' is an integer equal to 32*a.

In some examples, before intra prediction, the neighboring reference samples are filtered using a 2-Tap bilinear or 3-Tap (1,2,1)/4 filter, which can be referred to as intra reference smoothing or mode-dependent intra smoothing (MDIS). When performing intra prediction, given the intra-prediction mode index (predModeIntra) and block size (nTbS), it is decided whether a reference smoothing process is performed and which smoothing filter is used. The intra-prediction mode index is an index indicating an intra-prediction mode.

Inter-picture prediction uses the temporal correlation between pictures in order to derive a motion-compensated prediction for a block of image samples. Using a translational motion model, the position of a block in a previously decoded picture (a reference picture) is indicated by a motion vector (Δx, Δy), with Δx specifying the horizontal displacement and Δy specifying the vertical displacement of the reference block relative to the position of the current block. In some cases, a motion vector (Δx, Δy) can be in integer sample accuracy (also referred to as integer accuracy), in which case the motion vector points to the integer-pel grid (or integer-pixel sampling grid) of the reference frame. In some cases, a motion vector (Δx, Δy) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$,refIdx$_0$ and $\Delta x_1$, $y_1$,refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoding device 104 using a motion estimation process.

With inter-prediction using uni-prediction (also referred to as uni-directional inter-prediction), one set of motion parameters ($\Delta x_0$, $y_0$,refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, encoding device 104 and decoding device 112 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some examples, following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. The encoder engine 106 may form the TUs including the residual data for the CU, and may transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 106. In some examples, the encoder engine 106 may utilize a predefined scan order to scan the quantized transform coefficients to produce a serialized vector that can be entropy encoded. In some examples, the encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communication link 120 to the decoding device 112 of the receiving device. The input 114 of the decoding device 112 may receive the NAL units. The communication link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in a storage 108. The output 110 may retrieve the encoded video bitstream data from the encoder engine 106 or from the storage 108. The storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection, and may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to the storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may rescale and perform an inverse transform on the encoded video bitstream data. Residual data is passed to a prediction stage of the decoder engine 116. The decoder engine 116 predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 8. An example of specific details of the decoding device 112 is described below with reference to FIG. 9.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. In some examples, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

As noted above, the encoding device 104 may encode one or more blocks or rectangular regions of a picture of an original video sequence by using intra-prediction and/or intra-frame prediction to remove spatial redundancy. The decoding device 112 can decode an encoded block by using the same intra-prediction mode that was used by the encoding device 104. Intra-prediction modes describe different variants or approaches for calculating pixel values in the area being coded based on reference pixel values. In the VVC standard, one or more smoothing filters and interpolation filters can be selected based on the intra-prediction mode and subsequently applied to the reference pixels and/or the intra-prediction of the current block. In this approach, the same choice between smoothing filters and interpolation filters used for intra-prediction is applied for all block sizes, e.g., a fixed degree of smoothing is applied for all possible block sizes. Different directional intra-prediction modes are provided in the VVC standard.

Figure 2B:
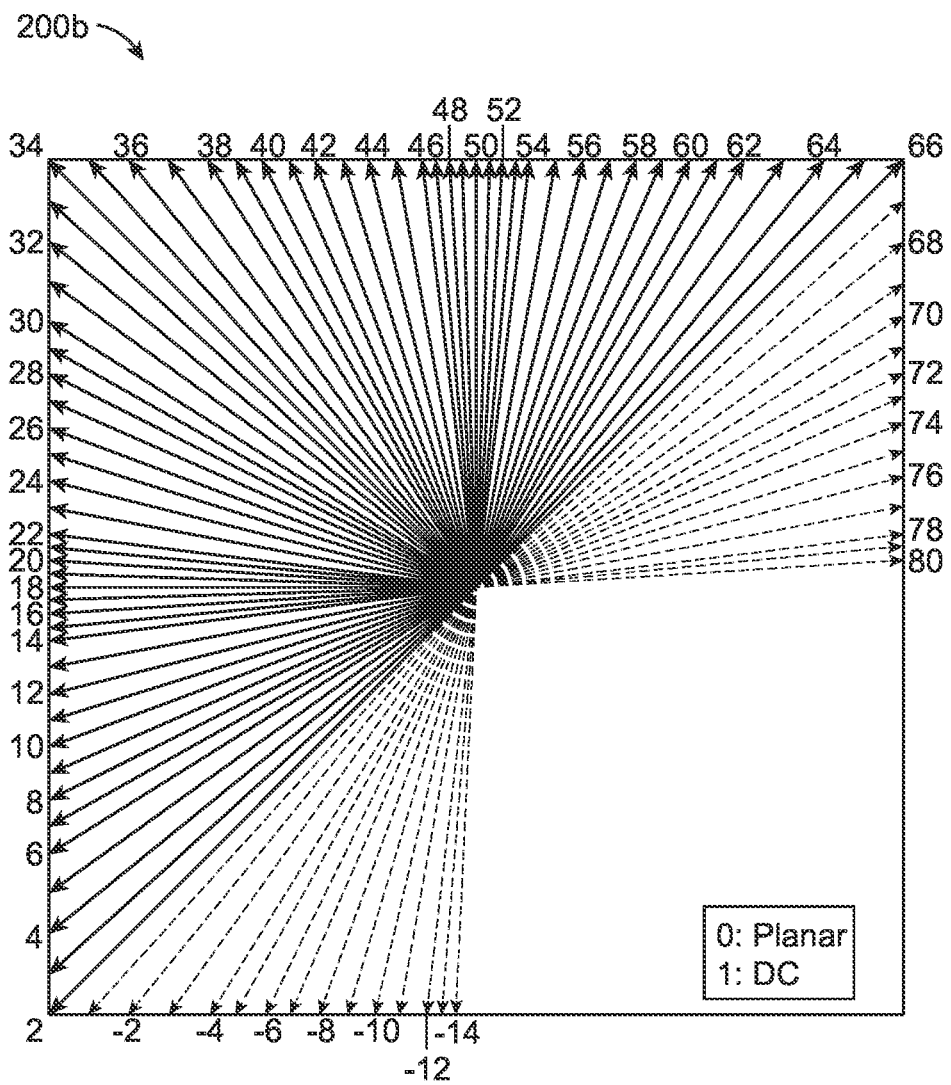
FIG. 2B is a diagram illustrating an example of the directional intra-prediction modes in Versatile Video Coding (VVC), in accordance with some examples.

FIG. 2B illustrates an example diagram 200b of the directional intra-prediction modes (also referred to as "angular intra-prediction modes") in VVC. In some examples, the planar and DC modes remain the same in VVC as they were in HEVC. As illustrated, the intra-prediction modes with even indices between 2 and 66 can be equivalent to the 33 HEVC intra-prediction modes, with the remaining intra-prediction modes of FIG. 2B representing the newly added intra-prediction modes in VVC. As an illustrative example, to better capture the arbitrary edge directions presented in natural video, the number of directional intra-prediction modes in VTM5 (VVC Test Model 5) was increased to a total of 93 directions from the 33 HEVC directions. The intra-prediction modes are described in more detail in B. Bross, J. Chen, S. Liu, "Versatile Video Coding (Draft 10)," 19th JVET Meeting, Teleconference, July 2020, JVET-S2001, which is hereby incorporated by reference in its entirety and for all purposes. In some examples, the denser directional intra-prediction modes introduced in the VVC standard can be applied for all block sizes and for both luma and chroma intra predictions. In some cases, these directional intra-prediction modes can be either used in combination with multiple reference lines (MRL), and/or with an intra-sub partition mode (ISP). Further details are described in J. Chen, Y. Ye, S. Kim, "Algorithm description for Versatile Video Coding and Test Model 10 (VTM10)," 19th JVET Meeting, Teleconference, July 2020, JVET-S2002, which is hereby incorporated by reference in its entirety and for all purposes.

Figure 3:
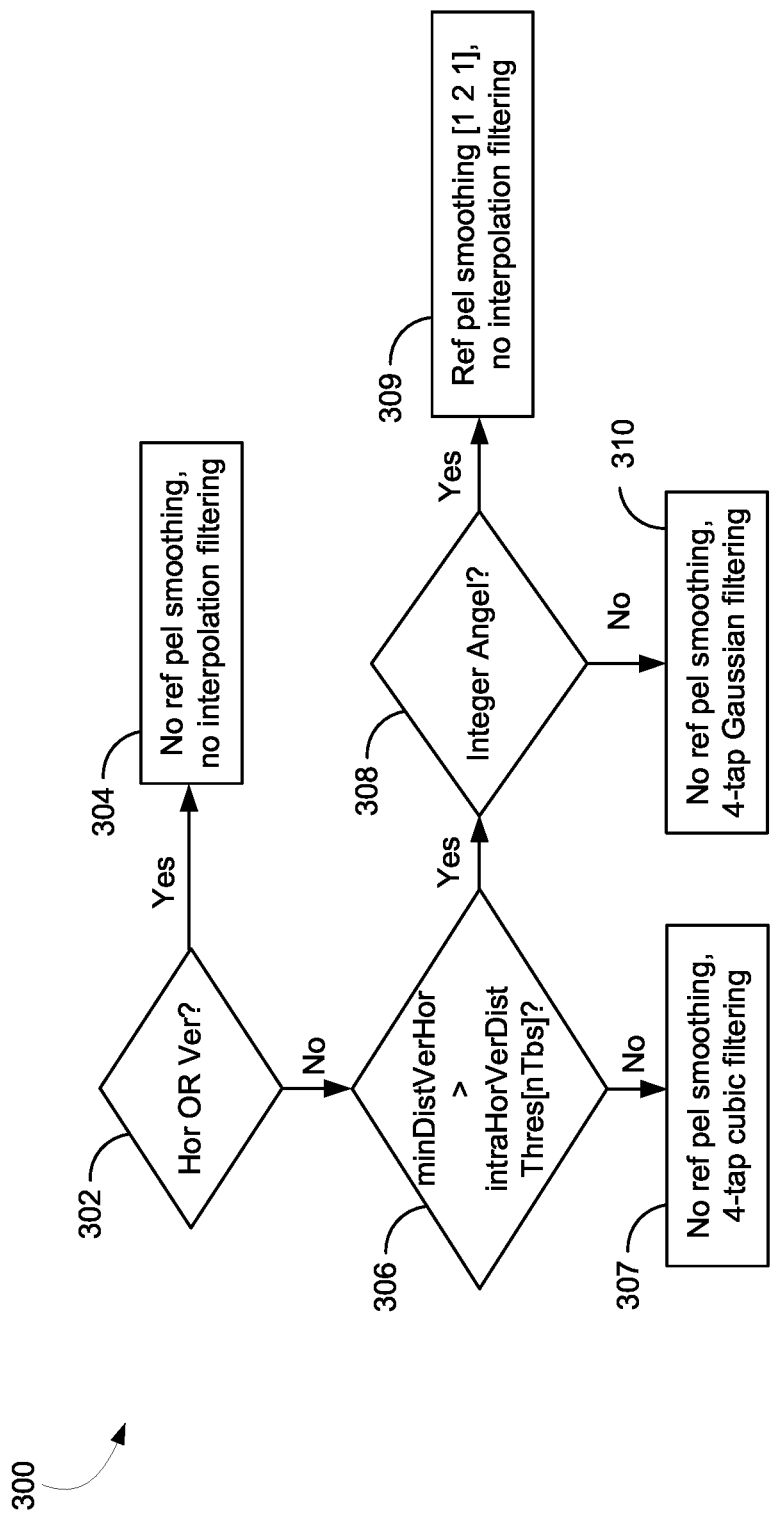
FIG. 3 is a diagram illustrating an example of a mode dependent intra smoothing (MDIS) process, in accordance with some examples.

In some examples, mode dependent intra smoothing (MDIS) can be utilized to smooth an intra-predicted signal by applying a smoothing filter and/or type of smoothing that is based on the intra-prediction mode of the currently coded block. FIG. 3 is a flow diagram illustrating an example of an MDIS process 300 that can be used for intra-prediction. In an illustrative example, the example MDIS process of FIG. 3 can be the same as an MDIS process of the VVC standard. The example MDIS process 300 can be used to select a specific interpolation filter and/or a specific smoothing filter to be used in intra-prediction for the currently coded block. As will be explained in greater depth below, in some examples the selection of an interpolation and/or smoothing filter can be based at least in part on the intra-prediction mode of the currently coded block.

The example MDIS process 300 can begin at operation 302 by determining whether or not the intra-prediction mode of the currently coded block is a horizontal intra-prediction mode or a vertical intra-prediction mode. Referring to the directional intra-prediction modes illustrated in FIG. 2B, the horizontal intra-prediction mode is indicated as mode 18 and the vertical intra-prediction mode is indicated as mode 50. In response to a determination at operation 302 that the intra-prediction mode is either a horizontal mode or a vertical mode (e.g., the 'Yes' output of 302), the example MDIS process can proceed to operation 304. As illustrated, operation 304 causes the MDIS process to end without performing reference pixel smoothing or applying an interpolation filter. In some examples, no smoothing or interpolation may be performed for the horizontal and vertical intra-prediction modes because the reference pixel values for these two modes can be directly copied in determining the predicted pixel values of the current block.

If the intra-prediction mode is not a horizontal or vertical mode (e.g., the 'No' output of operation 302), the example MDIS process can proceed to a determination of whether smoothing is needed for the current block. As illustrated, the determination of whether or not smoothing should be performed for the current block can be performed at operation 306, based at least in part on the intra-prediction mode of the current block. For example, the intra-prediction mode can be used to calculate a minimum distance minDistVerHor, e.g., where minDistVerHor is the minimum of {|intra-prediction mode number-vertical intra-prediction mode number|, |intra-prediction mode number-horizontal intra-prediction mode number|}. The minimum distance minDistVerHor can also be referred to as a minimum angular offset and/or a minimum angular distance. In an illustrative example, the vertical intra-prediction mode number can be 50 and the horizontal intra-prediction mode number can be 18. Therefore, if the intra-prediction mode number of the current block is 30, the minimum angular offset can be calculated as {|30-50|, |30-18|}=min{20, 12}=12.

In operation 306, the minimum angular offset minDistVerHor can then be compared to a threshold intraHorVerDistThres[nTbS], which in some examples can be a predetermined threshold value given by the VVC standard, e.g., determined by providing the current transform block size nTbS as an index to a lookup function or lookup table intraHorVerDistThres. As illustrated in FIG. 3, if the minimum angular offset minDistVerHor is not greater than the threshold intraHorVerDistThres[nTbS], then operation 306 can determine that no smoothing is needed for the current block, e.g., the 'No' output of 306.

If no smoothing is needed, then the example MDIS process can then proceed from operation 306 to operation 307, which is shown here as applying an interpolation filter without any reference pixel smoothing. In some examples, the interpolation filter applied by operation 307 can be a cubic interpolation filter such as a 4 tap (6-bit) cubic interpolation filter shown in FIG. 3. Because operation 306 determined that no direct reference pixel smoothing was needed, operation 307 can apply only the 4 tap cubic interpolation filter—e.g., no reference pixel smoothing is performed because the minimum angular offset indicated in operation 306 that the intra-prediction mode was within the threshold distance from either the horizontal mode or the vertical mode.

If operation 306 determines that the minimum angular offset minDistVerHor is greater than the threshold value intraHorVerDistThres[nTbS], then operation 306 can determine that smoothing is needed for the current block, e.g., the 'Yes' output. In response to a determination that smoothing is needed, the intra-prediction mode for the current block can be further analyzed in a subsequent operation 308.

In some examples, operation 308 can analyze the intra-prediction mode for the current block to determine whether it is an integer sloped intra-prediction mode or a fractional sloped intra-prediction mode (also referred to as "integer angle modes" and "fractional angle modes", respectively). As mentioned previously, an integer angle mode is associated with a specific, integer-valued reference pixel position of the current block, while a fractional angle mode is not. Fractional angle modes are instead associated with some intermediate (e.g., fractional) position between adjacent integer-valued reference pixel positions.

Based on operation 308 determining that the intra-prediction mode for the current block is an integer angle mode (e.g., the 'Yes' output of 308), then the operation 308 can proceed to operation 309. As illustrated, operation 309 can perform reference pixel smoothing but not interpolation, e.g., because in some cases it is determined that no interpolation is necessary for integer angled modes. For example, because the integer angled intra-prediction mode can directly make use of a reference pixel value, only reference pixel smoothing is performed. In some examples, the reference pixel smoothing of operation 309 can be performed by applying a low-pass filter, such as a [1 2 1] filter, which calculates the average of a sum consisting of two times the reference pixel value plus the values of the immediately adjacent left and right (or top and bottom) reference pixel positions.

Based on operation 308 determining that the intra-prediction mode for the current block is a fractional angle mode (e.g., a non-integer angle mode; the 'No' output of 308), then in some cases a subsequent operation 310 can calculate an interpolated value for the fractional reference pixel position associated with the intra-prediction mode. For example, operation 310 can calculate the interpolated fractional reference pixel position value can be calculated based on one or more reference pixel values obtained from one or more adjacent, integer-valued reference pixel positions. Recalling that it was previously determined in operation 306 that smoothing should be performed for intra-prediction of the current block (e.g., because operation 306 determined that the minimum angular offset minDistVerHor>the threshold value intraHorVerDistThres[nTbS]), the 'No' output of operation 308 can correspond to a scenario in which both smoothing and interpolation are applied to the current block.

In some examples, and as illustrated in FIG. 3, smoothing and interpolation operations can be performed in a single, combined step, e.g., by applying a smoothing interpolation filter. In an illustrative example, a smoothing interpolation filter can be provided as a Gaussian interpolation filter, which smooths the generated intra-prediction signal and interpolates the fractional reference pixel position value simultaneously. Smoothing interpolation filters, such as the aforementioned Gaussian interpolation filters, can apply smoothing without performing direct reference pixel smoothing. In some examples, the smoothing interpolation filter can include a 4 tap (6-bit) Gaussian interpolation filter, as illustrated in operation 310.

It is noted that in the context of the example MDIS process 300 of FIG. 3, the MDIS process (and the VVC standard) does not use a variable degree of smoothing based on block size or other characteristics. In some examples, the systems and techniques described herein can provide a variable degree of smoothness and/or interpolation, based at least in part on factors that include, but are not limited to, the intra-prediction mode of the current block, a size of the current block, a width of the current block, a height of the current block, etc.

In some cases, video coding techniques can include using directional intra-prediction modes with one or more of a main reference line extension (MRL) and/or an intra-sub partition mode (ISP) in order to perform intra-prediction. In an illustrative example, intra-prediction can include using one or more side reference pixels to extend a main reference pixel line for intra-prediction.

Figure 4:
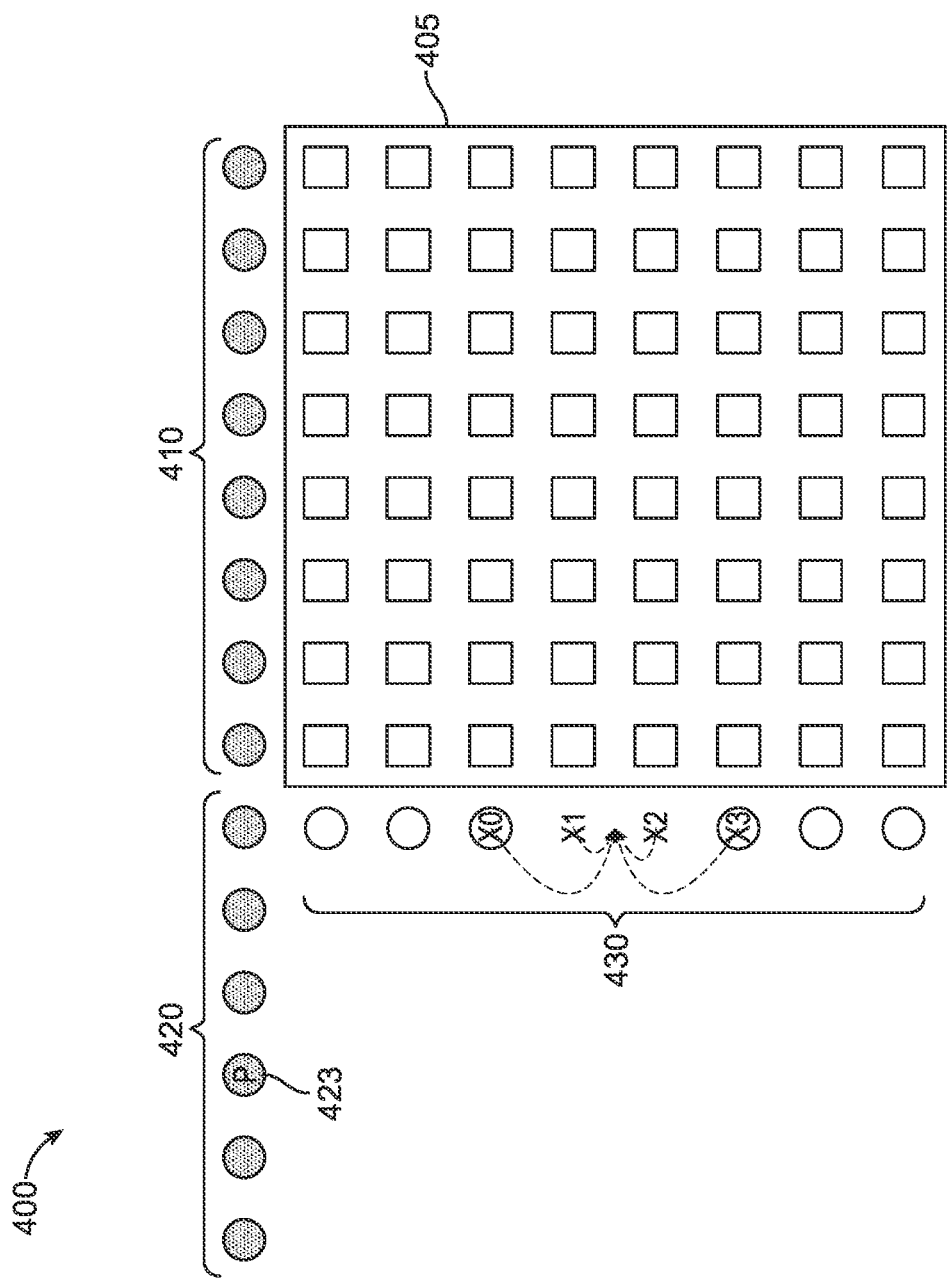
FIG. 4 is a diagram illustrating an example of reference line extension, in accordance with some examples.

FIG. 4 illustrates an example diagram 400 of reference line extension using one or more side reference pixels. Depicted for a currently coded block 405 is an upper line of reference pixels 410, which includes a series of calculated reference line extension pixels 420. Also shown is a set of left reference pixels 430. For intra-prediction of vertical modes (e.g., intra-prediction modes >=34, not to be confused with the specific vertical intra-prediction mode 50), one or more pixels from the left reference pixels 430 of the currently coded block 405 can be used to extend the upper line of reference pixels 410, e.g., by generating or otherwise calculating values for the reference line extension pixels 420. The calculation of the reference line extension pixels 420 can be used extend the length of the upper line of reference pixels 410 to extend beyond a far-left edge of the current block 405, as is illustrated in FIG. 4.

In the current VVC standard, the upper line of reference pixels 410 can be extended by identifying a nearest neighbor in the left reference pixels 430, wherein the value of the identified nearest neighbor is set equal to the value of at least one of the reference line extension pixels 420. In an illustrative example, FIG. 4 depicts a point P (e.g., indicated at 423) that is located in the reference line extension pixels 420 of the upper line of reference pixels 410. The upper reference pixel line 410 is extended based on the left reference pixels 430. In the current VVC standard, the reference line extension process proceeds by determining which of the left reference pixels 430 is the nearest neighbor to the extended reference line pixel P/423, and then setting the value of then extended reference line pixel P equal to the value of the identified nearest neighbor in left reference pixels 430. In the illustration of FIG. 4, the nearest neighbor within the column of left reference pixels 430 is indicated as X1, and the pixel value at the X1 position is therefore used for the create the extended reference line pixel P (e.g., 423). The upper line of reference pixels 410 can be extended to a desired length using this methodology, and intra-prediction subsequently performed using the extended reference line formed by the original upper line of reference pixels 410 and the reference line extension pixels 420. In some examples, a similar process can also be applied for intra-prediction of horizontal modes (e.g., intra-prediction modes <34, not to be confused with the specific horizontal intra-prediction mode 18), wherein values of identified nearest neighbor pixels in an upper reference line are projected to extend the left line of reference pixels.

Various improvements to the VVC intra-prediction process have been proposed in JVET-D0119, which is described in X. Zhao, V. Seregin, M. Karczewicz, "Six tap intra interpolation filter", 4th JVET Meeting, Chengdu, CN, October 2016, JVET-D0119, which is hereby incorporated by reference in its entirety and for all purposes. For example, JVET-D0119 proposed to improve the intra-prediction process by introducing the following two methods: (1) to use a 6 tap (8-bit) cubic interpolation instead of the 4 tap (6 bit) cubic interpolation as described above to perform the example MDIS process of FIG. 3; and (2) to use the same 4 tap (6-bit) cubic interpolation (again, as described above with respect to the example MDIS process of FIG. 3) to perform the example reference line extension described with respect to FIG. 4, instead of projecting a nearest neighbor pixel value.

As noted previously, in some examples larger block sizes can benefit from having a higher degree of smoothing applied during intra-prediction. However, VVC uses a fixed degree of smoothing (e.g., the 4 tap Gaussian interpolation or [1 2 1] filtering) for all block sizes, which can lead to inefficient or less efficient intra-prediction in light of the observation above. With respect to JVET-D0119, discussed above, the use of a 4 tap cubic interpolation to extend one or more lines of reference pixels (e.g., upper and/or left reference pixel lines) can be problematic because it can lead to over-smoothing when intra-prediction is performed using the extended portion(s) of an extended reference line, thereby introducing inaccuracies and/or inefficiencies to the overall intra-prediction process.

For example, over-smoothing can occur in such situations because the extended pixels of an extended reference line are subjected to at least two distinct interpolation operations—each of which introduces some degree of smoothing and edge degradation. The first interpolation operation is a 4 tap cubic interpolation to determine extended upper/left reference pixel line values based on nearest neighboring values from the left/upper reference pixels, respectively. The interpolated reference pixel values of the extended reference pixel line can subsequently be involved in a second interpolation operation during the intra-prediction for the current block, e.g., such as the interpolation operations described with respect to the exampled MDIS process of FIG. 3. For example, the interpolated reference pixel values of the extended reference pixel line can be utilized in one or more of a 4-tap cubic interpolation, a 4 tap Gaussian smoothing interpolation, and/or a low-pass [1 2 1] reference pixel smoothing, each of which can result in an over-smoothing in the overall intra-prediction process.

As noted previously, systems and techniques are described herein for performing intra-prediction using one or more enhanced interpolation filters. The systems and techniques can be performed by the encoding device 104, the decoding device 112, by both the encoding device 104 and the decoding device 112, and/or by other devices. The aspects described herein can be applied independently and/or in a combined manner. In some examples, the systems and techniques described herein can be used for performing one or more intra-prediction modes (e.g., for filtering used during or with the application of an intra-prediction mode).

In some examples, the systems and techniques described herein can provide a variable degree of reference pixel smoothing with block-level switching. For instance, multiple smoothing filters and/or Gaussian interpolation filters (also referred to as "Gaussian smoothing interpolating filters"), each with a different degree of smoothing, can be used for smoothing reference pixels during intra-prediction. In some cases, the selection of a determined smoothing filter and/or a determined interpolation filter can be signaled explicitly at different coding levels, e.g., signaled per prediction block, per coding block, per CTU, per slice, and/or at the sequence (e.g., in an SPS) level. In some examples, the selection of determined smoothing and/or interpolation filter can be determined implicitly using decoded information, which can include but is not limited to, block size, prediction mode, QP, and/or CU level mode flag (MRL, ISP etc.), in which cases explicit signaling of a filter choice is not needed. For instance, in some examples, the encoding device 104 and/or the decoding device 112 can implicitly determine or select a smoothing filter and/or an interpolation filter for use in intra-prediction based on a determination that the currently coded block has a certain size, has a width/and or height that is greater than a threshold, has a width and/or height that is less than a threshold, etc.

In one illustrative example, the treatment of fractional angle (e.g., non-integer angled) intra-prediction modes can be extended from the approach described in the VVC standard to include selecting between a first Gaussian smoothing interpolation filter that applies a higher degree of smoothing and at least a second Gaussian smoothing interpolation filter that applies a lower degree of smoothing. As discussed previously with respect to FIG. 3, the approach used by the VVC standard utilizes the same 4 tap Gaussian smoothing interpolation filter for all fractional angle intra-prediction modes, regardless of the size of the currently coded block.

Figure 5:
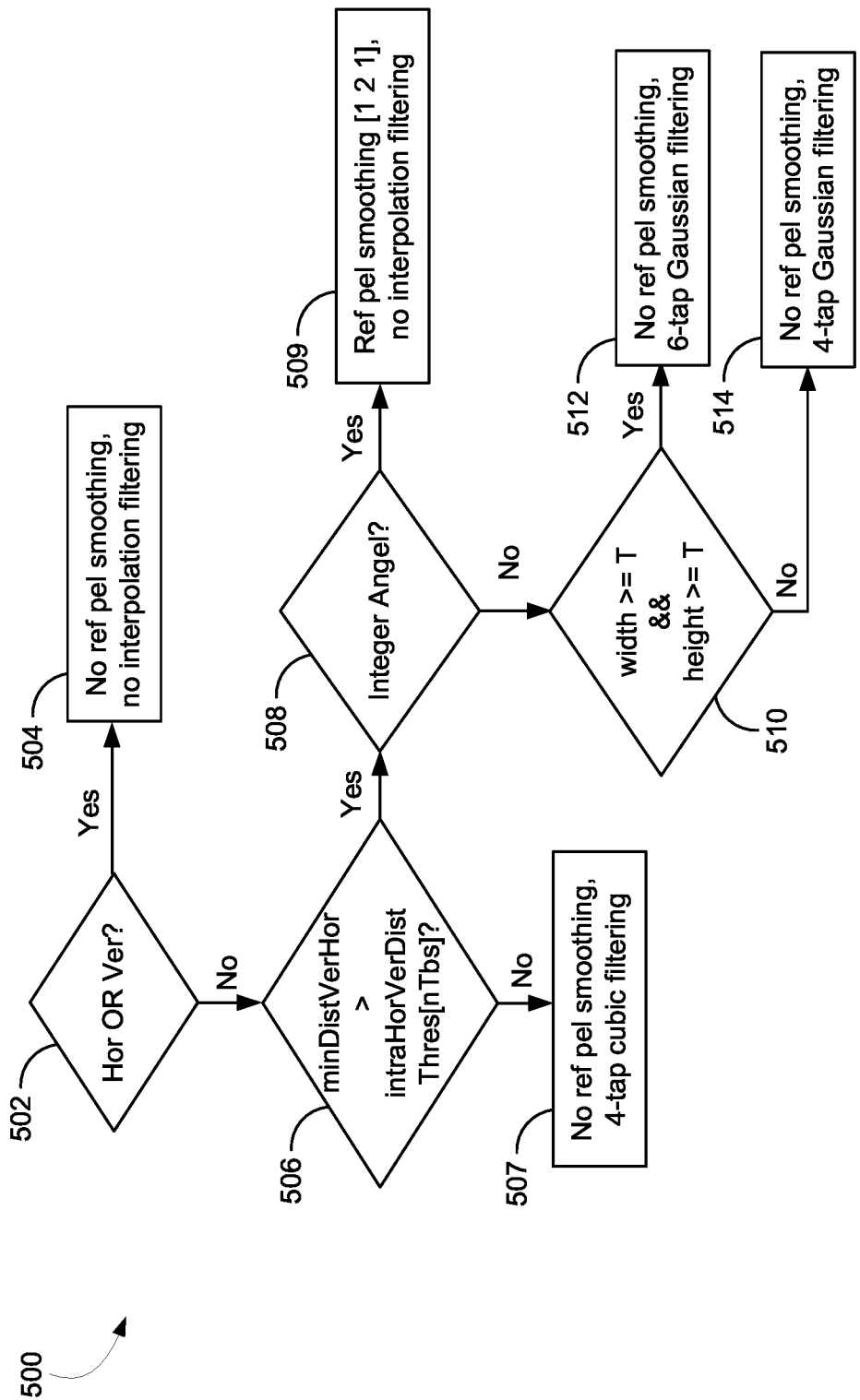
FIG. 5 is a diagram illustrating an example of switchable Gaussian filtering based on one or more of block size and intra-prediction mode, in accordance with some examples.

FIG. 5 is an example diagram illustrating an example of a process 500 for performing switchable smoothing and/or interpolation to apply a variable degree of intra-prediction smoothing based on at least an intra-prediction mode of the current block and a size of the current block. In the context of the example discussed immediately above, the presently disclosed systems and techniques for intra-prediction using enhanced interpolation filters can include, for fractional angle intra-prediction modes, selecting between a first filter comprising a 6 tap Gaussian smoothing interpolation filter and a second filter comprising a 4 tap Gaussian smoothing interpolation filter. The 6 tap Gaussian smoothing interpolating filter can apply a higher degree of smoothing than the 4 tap Gaussian smoothing interpolation filter. In some examples, the 4 tap Gaussian smoothing interpolation filter of FIG. 5 can be the same as or similar to the 4 tap Gaussian smoothing interpolation filter described with respect to the example VVC MDIS process 300 of FIG. 3. In some examples, the filtering, interpolation and/or smoothing degree selection process can be implicit in dependence on the block size of the currently coded block, as seen in FIG. 5.

In some examples, the variable smoothness filtering and interpolation process for reference pixels with block level switching that is illustrated in FIG. 5 can be the same as or similar to the example VVC MDIS process of FIG. 3, with the exception of operation 510 (e.g., comparing one or more of the width of the currently coded block and the height of the currently coded block to at least a first threshold T) and subsequent operations 512 (e.g., in response to the first threshold T being exceeded, selecting and applying a 6 tap Gaussian smoothing interpolation filter with a relatively high degree of smoothing) and 514 (e.g., in response to the first threshold T not being exceeded, selecting and applying a 4 tap Gaussian smoothing interpolation filter with a relatively low degree of smoothing).

At operation 502, the process can determine whether the intra-prediction mode for the currently decoded block is the horizontal intra-prediction mode (e.g., mode 18) or the vertical intra-prediction mode (e.g., mode 50). If the intra-prediction mode is either the horizontal mode or the vertical mode, then the process determines at block 504 not to perform reference pixel smoothing (referred to as 'ref pel smoothing' in FIG. 5) and not to perform interpolation filtering, as described previously with respect to the example MDIS process of FIG. 3. The process can then proceed to process the currently coded block and perform intra-prediction without applying reference pixel smoothing or interpolation filtering.

At operation 506, the process can determine whether the minimum angular offset minDistVerHor is greater than the threshold value intraHorVerDistThres[nTbS]. In some cases, one or more of the minDistVerHor and/or intraHorVerDistThres[nTbS] can be the same as or similar to the corresponding variables values discussed above with respect to the example MDIS process of FIG. 3. In an illustrative example, the angular offset variable minDistVerHor can be set equal to Min(Abs(predModeIntra−50), Abs(predModeIntra−18)), where predModeIntra indicates the intra-prediction mode number, 50 is the vertical intra-prediction mode number, and 18 is the horizontal intra-prediction mode numnber. In some cases, predModeIntra can be set equal to IntraPredModeY [xCb][yCb] or IntraPredModeC[xCb][yCb]. In some examples, the threshold value variable intraHorVerDistThres[nTbS] can be given as specified in Table 2 below for different values of the currently coded transform block size nTbS:

TABLE 2

Specification of the threshold value variable intraHorVerDistThres[nTbS] for various transform block sizes nTbS

| | nTbS = 2 | nTbS = 3 | nTbS = 4 | nTbS = 5 | nTbS = 6 |
|---|---|---|---|---|---|
| intraHorVerDistThres[nTbS] | 24 | 14 | 2 | 0 | 0 |

In some examples, if operation 506 determines that the angular offset minDistVerHor is not greater than the value of the threshold variable intraHorVerDistThres[nTbS], (e.g., minDistVerHor≤intraHorVerDistThres[nTbs]), the process can determine at an operation 507 not to perform reference pixel smoothing and can further determine to apply a 4 tap cubic interpolation filter for intra-prediction of the currently coded block. For example, the process can apply a 4 tap cubic filter to predict or interpolate one or more reference pixels without performing any reference pixel smoothing.

In the case in which the operation 506 determines that the angular offset minDistVerHor is greater than the threshold value intraHorVerDistThres[nTbS], (e.g., minDistVerHor>intraHorVerDistThres[nTbS]), the process can subsequently determine at operation 508 whether an integer angle mode is present in the intra-prediction mode of the currently coded block, as was described previously with respect to the example MDIS process of FIG. 3.

In one example, when operation 508 determines that an integer angle mode is present in the intra-prediction mode of the currently coded block, then the process can determine at operation 509 to perform reference pixel smoothing using a [1 2 1] low-pass filter and not to perform interpolation filtering. The process can then terminate at operation 509 after performing reference pixel smoothing to smooth the reference pixel using the [1 2 1] filter. No interpolation is performed, and smoothed reference pixels are directly copied for the intra-prediction for the currently coded block.

In one example, when operation 508 determines that a fractional (e.g., non-integer) angled mode is present in the intra-prediction mode of the currently coded block, the process can proceed to an operation 510, which can determine whether the width of the block is greater than or equal to a threshold T and/or whether a height of the block is greater than or equal to the threshold T. In some examples, operation 510 can include determining which one(s) of the width of the block and the height of the block are greater than or equal to the threshold T. In some examples, the value of the threshold T may be a predetermined value, e.g., 16, 32, 64, or one or more other predefined values.

In the case in which the width of the block and the height of the block are determined to be greater than or equal to the threshold T (e.g., height≥T && width≥T) at operation 510, then the process subsequently can determine at operation 512 not to perform reference pixel smoothing and terminates by applying a 6 tap Gaussian smoothing interpolation filter for intra-prediction of the currently coded block. For instance, the process can apply the 6 tap Gaussian smoothing interpolation filter to predict one or more pixels of the current block without any reference pixel smoothing.

In the case in which the width of the block or the height of the block are not greater than or equal to the threshold T (e.g., height<T and/or width<T), the process can determine at operation 514 not to perform reference pixel smoothing and terminates by applying a 4 tap Gaussian smoothing interpolation filter. For instance, the process can apply the 4 tap (6 bit) Gaussian smoothing interpolation filter to predict one or more pixels of the currently coded block without any reference pixel smoothing. As mentioned previously, the 4 tap Gaussian smoothing interpolation filter of operation 514 can apply a lesser degree of smoothing than the 6 tap Gaussian smoothing interpolation filter of operation 512, e.g., because operation 514 is triggered in response to operation 510 determining that the currently coded block has a relatively small block size. Similarly, the 6 tap Gaussian smoothing interpolation filter of operation 512 can be triggered based in part in response to operation 510 determining that the currently coded block has a relatively large block size, recalling that the 6 tap Gaussian smoothing interpolation filter applies a greater degree of smoothing and that larger block sizes can benefit from greater smoothing in comparison to smaller block sizes.

In some cases, the example 6 tap Gaussian smoothing interpolation filter applied in operation 514 can be derived using a convolution of a [1 4 6 4 1] low-pass filter and one or more different phases of a bilinear filter.

In one illustrative example, such as for scenarios in which operation 508 determines that the intra-prediction mode of the currently coded block is an integer angled mode, the operation 509 depicted in in FIG. 5 can be extended to include a selection between a larger tap smoothing filter (e.g., a [1 4 6 4 1] low-pass filter, not shown) and the smaller, [1 2 1] low-pass filter that is currently depicted as being applied in association with operation 509. In some examples, a selection criterion to select between a larger tap [1 4 6 4 1] filter and a smaller tap [1 2 1] filter can be performed in a manner that is the same as or similar to the selection criteria implemented in operation 510. For example, one or more of a width of the currently coded block and a height of the currently coded block can be compared to at least one threshold, wherein a larger block (e.g., determined to be greater than or equal to the threshold) has the larger tap [1 4 6 4 1] filter applied for intra-prediction and a smaller block (e.g., determined to be less than the threshold) has the smaller tap [1 2 1] filter applied for intra-prediction. In some cases, one or more of the same or similar explicit and/or explicit selection process(es) described with respect to operation 510 as being based on factors such as block size may be used in such an example where the integer angle reference pixel smoothing of operation 509 is extended to select between different tap filters and/or degrees of smoothing based on the currently coded block size.

In some examples, the systems and techniques described herein can perform weak filtering interpolation for reference line extension, e.g., avoiding or minimizing the over-smoothing issue discussed above as potentially occurring when the reference line extension is based on a 4 tap cubic interpolation and subsequently subjected to another interpolation during intra-prediction. For instance, instead of using 4 tap cubic filtering to interpolate a value for a reference line extension pixel (e.g., interpolated based on nearest neighboring pixel values of a perpendicular pixel reference), a weaker filter-based interpolation can be used to reduce or mitigate possible over-smoothing issues that may otherwise arise in the context of extending the reference line. By utilizing a weaker interpolation to determine values of reference line extension pixels, the remaining intra-prediction process, and its associated interpolation and smoothing operations described herein, can remain the same without causing the aforementioned issue of over-smoothing.

In one illustrative example, a 4 tap sinc-based interpolation (e.g., with appropriate windowing) can be used to provide the weak interpolation for purposes of calculating interpolated values for reference line extension pixels. In some examples, the 4 tap sinc-based interpolation can be weaker than a cubic interpolation, such as the 4 tap cubic interpolation (e.g., which has higher cutoff frequency). In an illustrative example, the weak interpolation for reference line extension pixels can be provided as a 6-bit 4 tap weak filter, an example of which is provided below (noting that the coefficient at position (32−i)/32 is the mirrored version of i/32):

{0, 64, 0, 0}, // 0/32 position
{−1, 64, 1, 0}, // 1/32 position
{−3, 65, 3, −1}, // 2/32 position
{−3, 63, 5, −1}, // 3/32 position
{−4, 63, 6, −1}, // 4/32 position
{−5, 62, 9, −2}, // 5/32 position
{−5, 60, 11, −2}, // 6/32 position
{−5, 58, 13, −2}, // 7/32 position
{−6, 57, 16, −3}, // 8/32 position
{−6, 55, 18, −3}, // 9/32 position
{−7, 54, 21, −4}, // 10/32 position
{−7, 52, 23, −4}, // 11/32 position
{−6, 48, 26, −4}, // 12/32 position
{−7, 47, 29, −5}, // 13/32 position
{−6, 43, 32, −5}, // 14/32 position
{−6, 41, 34, −5}, // 15/32 position
{−5, 37, 37, −5}, // 16/32 position The systems and techniques allow prediction (e.g., intra prediction) to be performed using enhanced interpolation filters. The systems and techniques described herein can, in some examples, provide advantages over other techniques that utilize multiple interpolation filters. For instance, in some cases, multiple interpolation filters, for example, with different interpolation filter taps may be applied within one block, slice, tile, and/or picture. In one example, an interpolation filter type and the interpolation filter tap (length) may depend on the height and/or width of a block, the block shape (the ratio of width versus height), the block area size, the intra prediction modes and/or neighboring decoded information, including but not limited to the reconstructed sample values and intra prediction modes, etc. In such cases, when the intra prediction is a vertical-like angular intra-prediction mode, and if the width is less than or equal to 8 or other size, a 6-tap Sextic interpolation filter is used; otherwise, a 4-tap Gaussian interpolation filter is used. When the intra prediction is a horizontal-like intra-prediction mode, and if the width is less than or equal to 8 or other size, the 6-tap Sextic interpolation filter is used, otherwise, the 4-tap Gaussian interpolation filter is used. In one example using the systems and techniques described herein, if the width and height of the coding block is greater than or equal to a threshold T, a 6 tap Gaussian filter is used (and no pixel smoothing is applied); otherwise, a 4 tap Gaussian filter is used (and no pixel smoothing is applied).

Figure 6:
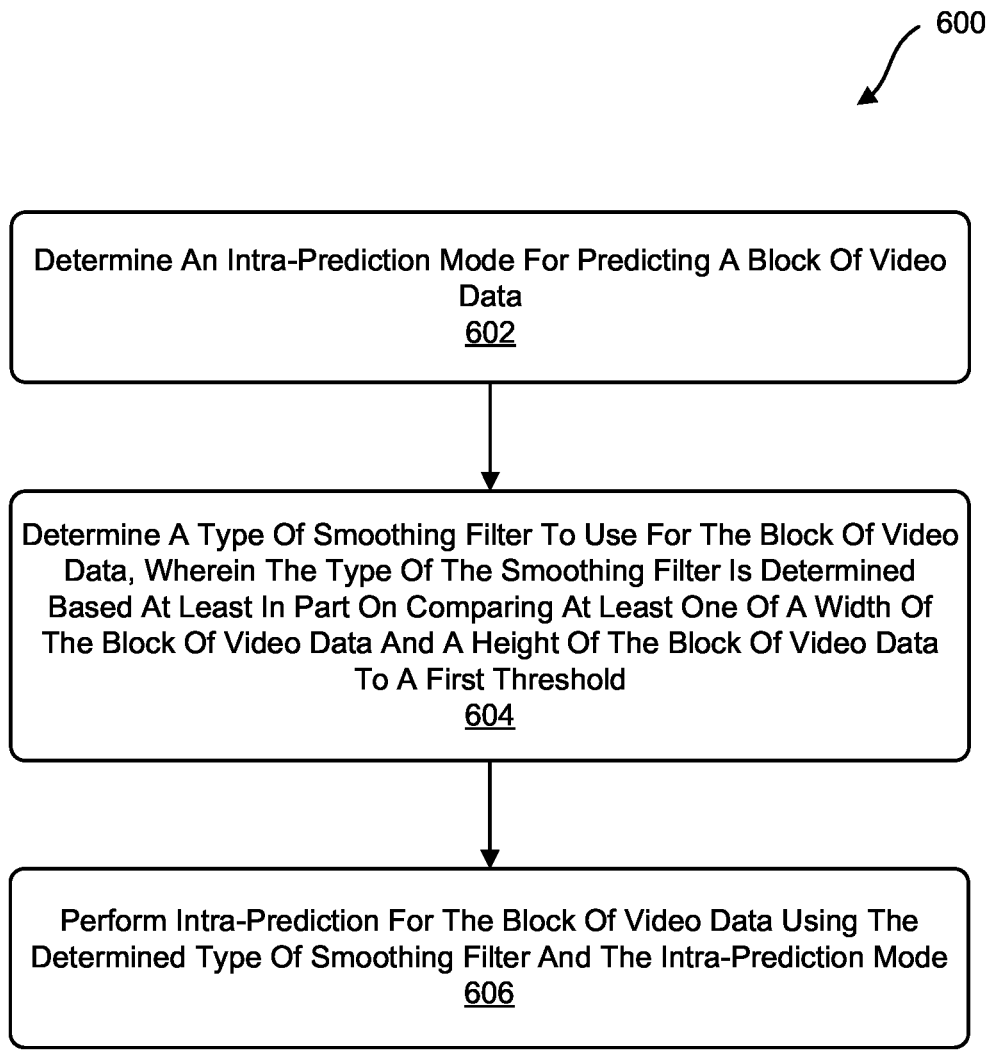
FIG. 6 is a flow chart illustrating an example of a process for performing intra-prediction with enhanced interpolation filters, in accordance with some examples.

FIG. 6 is a flowchart illustrating an example of a process 600 for processing image and/or video data. At block 602, the process 600 can include determining an intra-prediction mode for predicting a block of video data.

At block 604, the process 600 can include determining a type of smoothing filter to use for the block of video data. For example, the process 600 can determine the type of the smoothing filter based at least in part on comparing at least one of a width of the block of video data and a height of the block of video data to a first threshold. In some aspects, the type of smoothing filter is signaled in a video bitstream. In some cases, the type of smoothing filter is signaled for individual ones of a set of prediction blocks, coding blocks, coding tree units (CTUs), slices, or sequences. At block 606, the process 600 can include performing intra-prediction for the block of video data using the determined type of smoothing filter and the intra-prediction mode.

In some examples, the process 600 can include using a first smoothing interpolation filter as the determined type of smoothing filter based at least in part on a determination that at the width of the block, the height of the block, or the width and height of the block is/are greater than the first threshold. In one illustrative example, the first smoothing interpolation filter includes a 6 tap Gaussian filter. In such examples, the process 600 can further include determining, using the first smoothing interpolation filter, a reference pixel for intra-prediction of the block of video data.

In some examples, the process 600 can include using a second smoothing interpolation filter as the determined type of smoothing filter based at least in part on a determination that the width of the block, the height of the block, or the width and height of the block is/are not greater than (e.g., is/are less than) the first threshold. In one illustrative example, the second smoothing interpolation filter includes a 4 tap Gaussian filter. In such examples, the process 600 can further include determining, using the second smoothing interpolation filter, a reference pixel for intra-prediction of the block of video data.

In some cases, the process 600 can include determining a minimum offset between an angular direction of the intra-prediction mode and one of a vertical intra-prediction mode and a horizontal intra-prediction mode. The process 600 can further include determining the type of smoothing filter to use for the block of video data based on comparing the determined minimum offset to a second threshold. In one example, the process 600 can include determining a low-pass filter as the type of smoothing filter based at least in part on a determination that the determined minimum offset is greater than the second threshold and a determination that the intra-prediction mode is an integer angled mode associated with an integer-valued reference pixel position. In one illustrative example, the low-pass filter includes a [1 2 1] filter and performs reference pixel smoothing without interpolation.

In another example, the process 600 can include determining a Gaussian filter as the type of smoothing filter based at least in part on a determination that the determined minimum offset is greater than the second threshold and a determination that the intra-prediction mode is a fractional angled mode associated with a fractional-valued reference pixel position. In some cases, the Gaussian filter performs smoothing interpolation without reference pixel smoothing. In one illustrative example, the Gaussian filter includes a 6 tap Gaussian filter based on a determination that at least one of the width of the block and the height of the block are greater than the first threshold. In another illustrative example, the Gaussian filter includes a 4 tap Gaussian filter based on a determination that at least one of the width of the block and the height of the block are not greater than the first threshold.

In some aspects, the process 600 can include using an interpolation filter as the determined type of smoothing filter based at least in part on a determination that the determined minimum offset is not greater than (e.g., is less than) the second threshold. In one illustrative example, the interpolation filter includes a 4 tap cubic filter. The process 600 can further include performing intra-prediction for the block of video data using the interpolation filter without applying reference pixel smoothing.

In some examples, the process 600 can include determining a low-pass filter as the type of smoothing filter based at least in part on a determination that the intra-prediction mode is an integer angled mode and a determination that the determined minimum offset is greater than the second threshold. In some cases, the process 600 can include performing reference pixel smoothing using a large tap low-pass filter based at least in part on a determination that the width of the block, the height of the block, or the width and height of the block is/are greater than the first threshold. The large tap low-pass filter applies a greater degree of reference pixel smoothing than a small tap low-pass filter. In some cases, the process 600 can include performing reference pixel smoothing using a small tap low-pass filter based at least in part on a determination that the width of the block, the height of the block, or the width and height of the block is/are not greater than (e.g., is/are less than) the first threshold. The small tap low-pass filter applies a lesser degree of reference pixel smoothing than a large tap low-pass filter.

In some cases, the process 600 can include determining that the intra-prediction mode is an integer-angled mode based at least in part on comparing a slope of the intra-prediction mode to one or more pixel positions determined from the width of the block and the height of the block.

In some aspects, the process 600 can include determining that an offset between an angular direction of the intra-prediction mode and a vertical intra-prediction mode or a horizontal intra-prediction mode is less than a second threshold. The process 600 can further include performing intra-prediction for the block of video data using a cubic interpolation filter based on determining that the offset between the angular direction of the intra-prediction mode and the vertical intra-prediction mode or the horizontal intra-prediction mode is less than the second threshold.

In some examples, the process 600 can include performing reference line extension using a weak interpolation filter. In some cases, the weak interpolation filter is used to perform the reference line extension prior to use of the cubic interpolation filter to perform intra-prediction. In some cases, the cubic interpolation filter has a higher cutoff frequency than the weak interpolation filter and applies a greater degree of smoothing than the weak interpolation filter. In some aspects, the weak interpolation filter includes a 4 tap sinc-based interpolation filter and a 6-bit 4 tap interpolation filter.

In some aspects, the process 600 can include determining the type of smoothing filter based on the width of the block, the height of the block, or the width and height of the block without using information explicitly signaled in a video bitstream.

Figure 8:
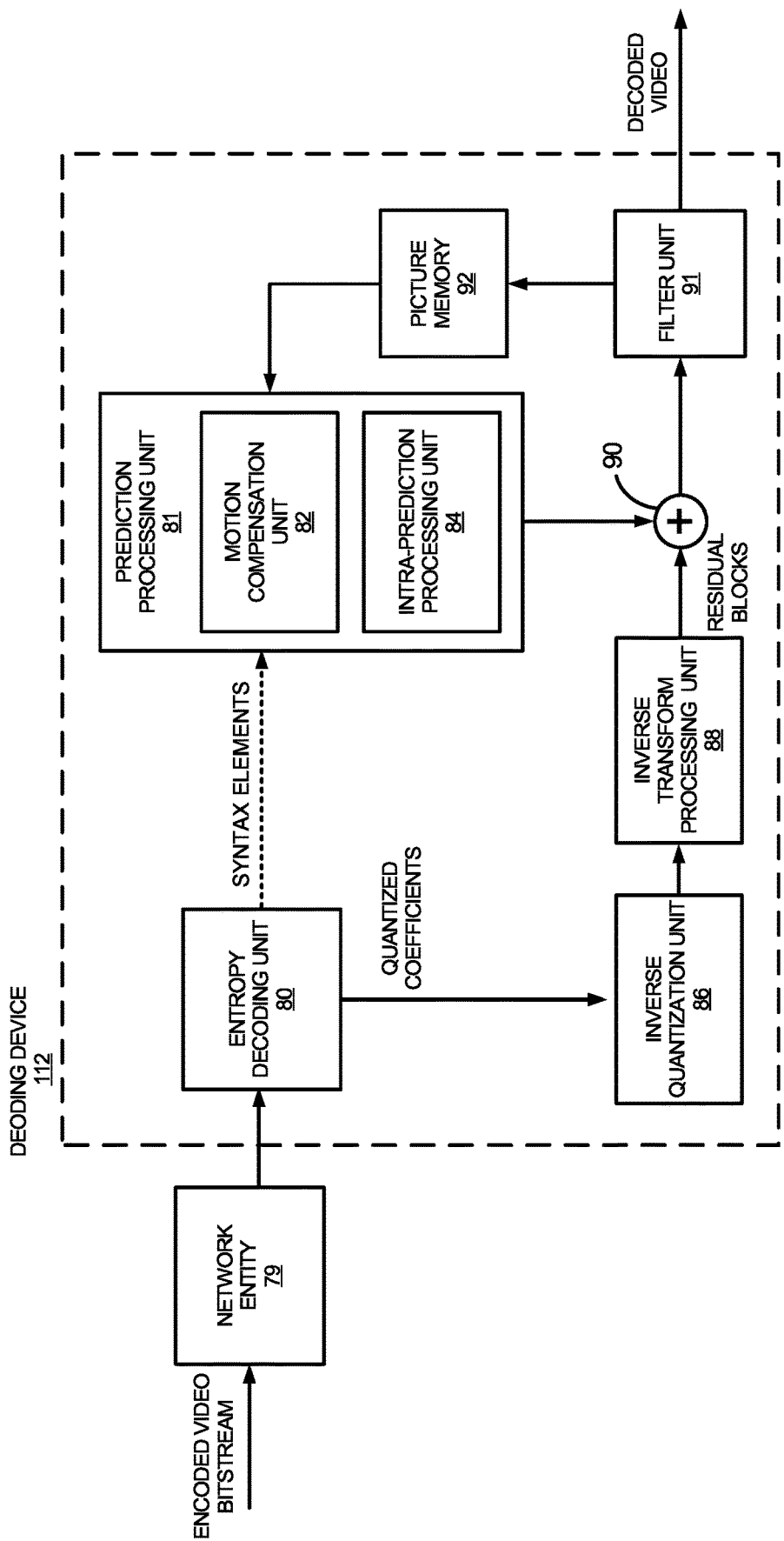
FIG. 8 is a block diagram illustrating an example video decoding device, in accordance with some examples.

In some cases, the process 600 can be performed by a decoding device (e.g., the decoding device 112 of FIG. 1 and FIG. 8). For instance, the process 600 can further include determining a block of residual data for the block of video data. The process 600 can include decoding the block of video data using the block of residual data and a predictive block determined based on performing the intra-prediction for the block of video data.

Figure 7:
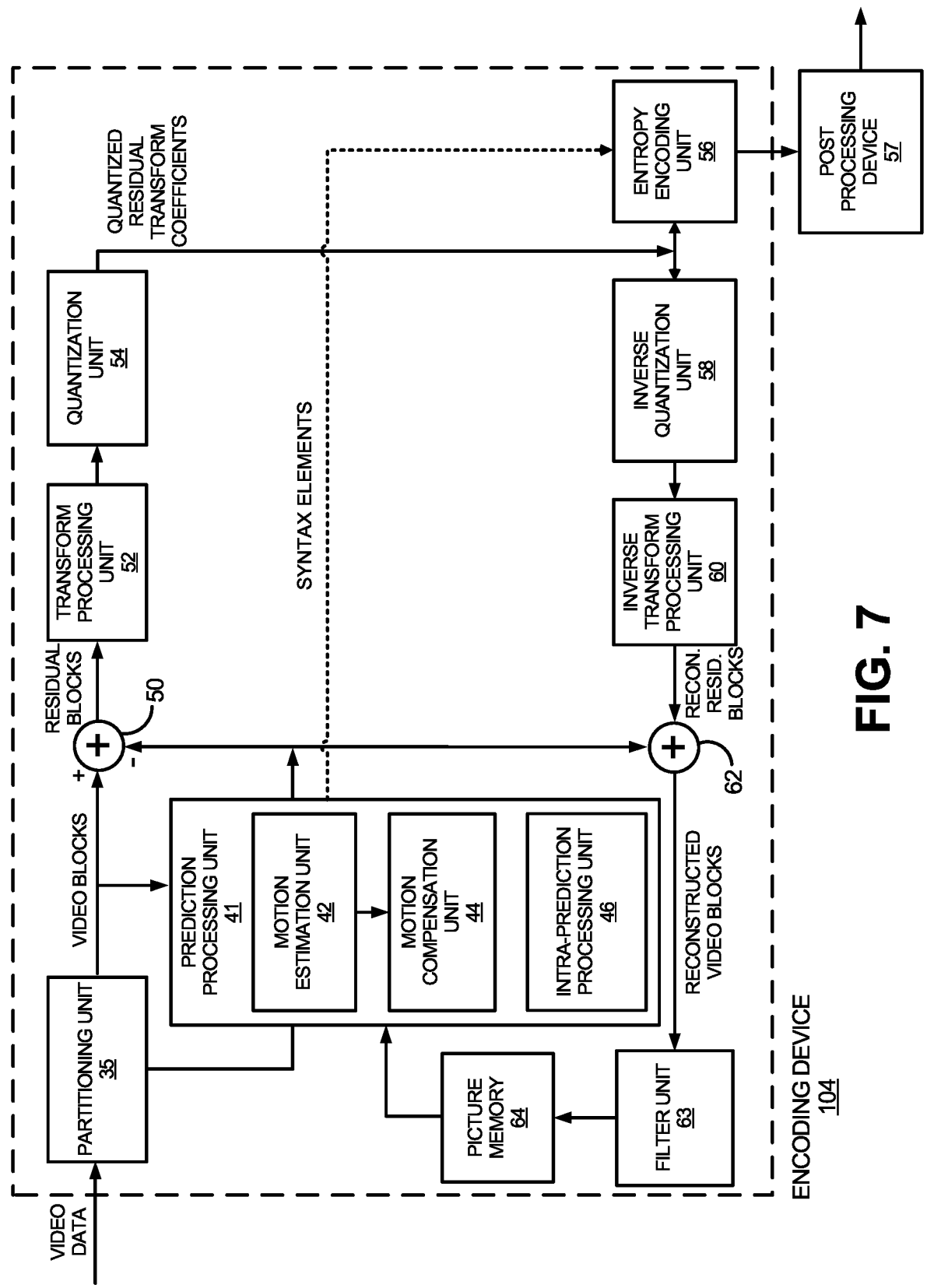
FIG. 7 is a block diagram illustrating an example video encoding device, in accordance with some examples.

In some cases, the process 600 can be performed by an encoding device (e.g., the encoding device 104 of FIG. 1 and FIG. 7). For instance, the process 600 can include generating an encoded video bitstream including information associated with the block of video data. In some examples, the process 600 can include storing the encoded video bitstream (e.g., in the at least one memory of the apparatus). In some examples, the process 600 can include transmitting the encoded video bitstream (e.g., using a transmitter of the apparatus).

In some implementations, the processes (or methods) described herein can be performed by a computing device or an apparatus, such as the system 100 shown in FIG. 1. For example, the processes can be performed by the encoding device 104 shown in FIG. 1 and FIG. 8, by another video source-side device or video transmission device, by the decoding device 112 shown in FIG. 1 and FIG. 9, and/or by another client-side device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Specific details of the encoding device 104 and the decoding device 112 are shown in FIG. 8 and FIG. 9, respectively. FIG. 8 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 8 as being an in-loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 8, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 8 represents an example of a video encoder configured to perform the techniques described herein. For instance, the encoding device 104 may perform any of the techniques described herein, including the processes described herein. In some cases, some of the techniques of this disclosure may also be implemented by post processing device 57.

FIG. 9 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 8.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 9 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 9 represents an example of a video decoder configured to perform the techniques described herein. For instance, the decoding device 112 may perform any of the techniques described herein, including the processes described herein.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. While illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Aspect 1: A method of processing video data, the method comprising: obtaining a block of video data; processing the block using an intra-prediction mode; and determining, based on at least one of a width and a height of the block, a type of interpolation filter to use for the block.

Aspect 2: The method of aspect 1, further comprising: based a determination that at least one of the width of the block and the height of the block is greater than a threshold, determining a first type of interpolation filter to use for the block; and determining a reference pixel for the block using the first type of interpolation filter.

Aspect 3: The method of aspect 1, wherein the first type of interpolation filter includes a 6 tap Gaussian filter.

Aspect 4: The method of aspect 1, further comprising: based a determination that at least one of the width of the block and the height of the block is not greater than a threshold, determining a second type of interpolation filter to use for the block; and determining a reference pixel for the block using the second type of interpolation filter.

Aspect 5: The method of aspect 4, wherein the second type of interpolation filter includes a 4 tap Gaussian filter.

Aspect 6: The method of any one of aspects 1 to 5, wherein the type of interpolation filter is explicitly signaled in a video bitstream.

Aspect 7: The method of aspect 6, wherein the type of interpolation filter is signaled explicitly per prediction block, coding block, coding tree unit (CTU), slice, or sequence.

Aspect 8: The method of any one of aspects 1 to 5, further comprising determining the type of interpolation filter based on at least one of the width and the height of the block without using information explicitly signaled in a video bitstream.

Aspect 9: An apparatus comprising a memory configured to store video data and a processor configured to: obtain a block of video data; process the block using an intra-prediction mode; and determine, based on at least one of a width and a height of the block, a type of interpolation filter to use for the block.

Aspect 10: The apparatus of aspect 9, wherein the processor is configured to: based a determination that at least one of the width of the block and the height of the block is greater than a threshold, determine a first type of interpolation filter to use for the block; and determine a reference pixel for the block using the first type of interpolation filter.

Aspect 11: The apparatus of aspect 9, wherein the first type of interpolation filter includes a 6 tap Gaussian filter.

Aspect 12: The apparatus of aspect 9, wherein the processor is configured to: based a determination that at least one of the width of the block and the height of the block is not greater than a threshold, determine a second type of interpolation filter to use for the block; and determine a reference pixel for the block using the second type of interpolation filter.

Aspect 13: The apparatus of aspect 12, wherein the second type of interpolation filter includes a 4 tap Gaussian filter.

Aspect 14: The apparatus of any one of aspects 9 to 13, wherein the type of interpolation filter is explicitly signaled in a video bitstream.

Aspect 15: The apparatus of aspect 14, wherein the type of interpolation filter is signaled explicitly per prediction block, coding block, coding tree unit (CTU), slice, or sequence.

Aspect 16: The apparatus of any one of aspects 9 to 13, wherein the processor is configured to determine the type of interpolation filter based on at least one of the width and the height of the block without using information explicitly signaled in a video bitstream.

Aspect 17: The apparatus of any one of aspects 9 to 16, wherein the apparatus includes an encoder.

Aspect 18: The apparatus of any one of aspects 9 to 17, wherein the apparatus includes a decoder.

Aspect 19: The apparatus of any one of aspects 9 to 18, wherein the apparatus is a mobile device.

Aspect 20: The apparatus of any one of aspects 9 to 19, wherein the apparatus is an extended reality device.

Aspect 21: The apparatus of any one of aspects 9 to 20, further comprising a display configured to display the video data.

Aspect 22: The apparatus of any one of aspects 9 to 21, further comprising a camera configured to capture one or more pictures.

Aspect 23: A computer readable medium having stored thereon instructions that when executed by a processor perform the methods of any of aspects 1 to 22.

Aspect 24: An apparatus comprising means for performing the operations of any of aspects 1 to 22.

Aspect 25: A method of processing video data, the method comprising: obtaining a block of video data; processing the block using an intra-prediction mode; and determining, based on at least one of a width and a height of the block, a type of smoothing filter to use for the block.

Aspect 26: The method of aspect 25, further comprising: determining whether an angle of the intra-prediction mode is an integer angle; wherein determining the type of smoothing filter is further based on a determination that the angle of the intra-prediction mode is an integer angle.

Aspect 27: The method of any one of aspects 25 or 26, further comprising: based a determination that at least one of the width of the block and the height of the block is greater than a threshold, determining a first type of smoothing filter to use for the block; and processing at least one predicted pixel for the block using the first type of smoothing filter.

Aspect 28: The method of aspect 27, wherein the first type of smoothing filter includes a [1 4 6 4 1] filter.

Aspect 29: The method of any one of aspects 25 or 26, further comprising: based a determination that at least one of the width of the block and the height of the block is not greater than a threshold, determining a second type of smoothing filter to use for the block; and processing at least one predicted pixel for the block using the second type of smoothing filter.

Aspect 30: The method of aspect 29, wherein the second type of smoothing filter includes a [1 2 1] filter.

Aspect 31: The method of any one of aspects 25 to 30, wherein the type of smoothing filter is explicitly signaled in a video bitstream.

Aspect 32: The method of aspect 31, wherein the type of interpolation filter is signaled explicitly per prediction block, coding block, coding tree unit (CTU), slice, or sequence.

Aspect 33: The method of any one of aspects 25 to 30, further comprising determining the type of smoothing filter based on at least one of the width and the height of the block without using information explicitly signaled in a video bitstream.

Aspect 34: An apparatus comprising a memory configured to store video data and a processor configured to: obtain a block of video data; process the block using an intra-prediction mode; and determine, based on at least one of a width and a height of the block, a type of smoothing filter to use for the block.

Aspect 35: The apparatus of aspect 34, wherein the processor is configured to: determine whether an angle of the intra-prediction mode is an integer angle; wherein determining the type of smoothing filter is further based on a determination that the angle of the intra-prediction mode is an integer angle.

Aspect 36: The apparatus of any one of aspects 34 or 35, wherein the processor is configured to: based a determination that at least one of the width of the block and the height of the block is greater than a threshold, determine a first type of smoothing filter to use for the block; and process at least one predicted pixel for the block using the first type of smoothing filter.

Aspect 37: The apparatus of aspect 36, wherein the first type of smoothing filter includes a [1 4 6 4 1] filter.

Aspect 38: The apparatus of any one of aspects 34 or 35, wherein the processor is configured to: based a determination that at least one of the width of the block and the height of the block is not greater than a threshold, determine a second type of smoothing filter to use for the block; and process at least one predicted pixel for the block using the second type of smoothing filter.

Aspect 39: The apparatus of aspect 38, wherein the second type of smoothing filter includes a [1 2 1] filter.

Aspect 40: The apparatus of any one of aspects 34 to 39, wherein the type of smoothing filter is explicitly signaled in a video bitstream.

Aspect 41: The apparatus of aspect 40, wherein the type of interpolation filter is signaled explicitly per prediction block, coding block, coding tree unit (CTU), slice, or sequence.

Aspect 42: The apparatus of any one of aspects 34 to 39, wherein the processor is configured to determine the type of smoothing filter based on at least one of the width and the height of the block without using information explicitly signaled in a video bitstream.

Aspect 43: The apparatus of any one of aspects 34 to 42, wherein the apparatus includes an encoder.

Aspect 44: The apparatus of any one of aspects 34 to 43, wherein the apparatus includes a decoder.

Aspect 45: The apparatus of any one of aspects 34 to 44, wherein the apparatus is a mobile device.

Aspect 46: The apparatus of any one of aspects 34 to 45, wherein the apparatus is an extended reality device.

Aspect 47: The apparatus of any one of aspects 34 to 46, further comprising a display configured to display the video data.

Aspect 48: The apparatus of any one of aspects 34 to 47, further comprising a camera configured to capture one or more pictures.

Aspect 49: A computer readable medium having stored thereon instructions that when executed by a processor perform the methods of any of aspects 25 to 48.

Aspect 50: An apparatus comprising means for performing the operations of any of aspects 25 to 48.

Aspect 51: A computer readable medium having stored thereon instructions that when executed by a processor perform the methods of any of aspects 1 to 22 and aspects 25 to 48.

Aspect 52: An apparatus comprising means for performing the operations of any of aspects 1 to 22 and aspects 25 to 48.

Aspect 53: An apparatus for processing video data, comprising: at least one memory; and at least one processor coupled to the at least one memory and configured to: determine an intra-prediction mode for predicting a block of video data; determine a type of smoothing filter to use for the block of video data, wherein the type of the smoothing filter is determined based at least in part on comparing at least one of a width of the block of video data and a height of the block of video data to a first threshold; and perform intra-prediction for the block of video data using the determined type of smoothing filter and the intra-prediction mode.

Aspect 54: The apparatus of Aspect 53, wherein the at least one processor is configured to: use a first smoothing interpolation filter as the determined type of smoothing filter based at least in part on a determination that at least one of the width of the block and the height of the block is greater than the first threshold; and determine, using the first smoothing interpolation filter, a reference pixel for intra-prediction of the block of video data.

Aspect 55: The apparatus of any of Aspects 53 to 54, wherein the first smoothing interpolation filter includes a 6 tap Gaussian filter.

Aspect 56: The apparatus of Aspect 55, wherein the at least one processor is configured to: use a second smoothing interpolation filter as the determined type of smoothing filter based at least in part on a determination that at least one of the width of the block and the height of the block is not greater than the first threshold; and determine, using the second smoothing interpolation filter, a reference pixel for intra-prediction of the block of video data.

Aspect 57: The apparatus of Aspect 56, wherein the second smoothing interpolation filter includes a 4 tap Gaussian filter.

Aspect 58: The apparatus of any of Aspects 53 to 57, wherein the at least one processor is configured to: determine a minimum offset between an angular direction of the intra-prediction mode and one of a vertical intra-prediction mode and a horizontal intra-prediction mode; and determine the type of smoothing filter to use for the block of video data based on comparing the determined minimum offset to a second threshold.

Aspect 59: The apparatus of Aspect 58, wherein the at least one processor is configured to: determine a low-pass filter as the type of smoothing filter based at least in part on a determination that the determined minimum offset is greater than the second threshold and a determination that the intra-prediction mode is an integer angled mode associated with an integer-valued reference pixel position.

Aspect 60: The apparatus of Aspect 59, wherein the low-pass filter performs reference pixel smoothing without interpolation, the low-pass filter including a [1 2 1] filter.

Aspect 61: The apparatus of Aspect 58, wherein the at least one processor is configured to: determine a Gaussian filter as the type of smoothing filter based at least in part on a determination that the determined minimum offset is greater than the second threshold and a determination that the intra-prediction mode is a fractional angled mode associated with a fractional-valued reference pixel position.

Aspect 62: The apparatus of Aspect 61, wherein the Gaussian filter performs smoothing interpolation without reference pixel smoothing.

Aspect 63: The apparatus of Aspect 61, wherein the Gaussian filter includes a 6 tap Gaussian filter based on a determination that at least one of the width of the block and the height of the block are greater than the first threshold.

Aspect 64: The apparatus of Aspect 61, wherein the Gaussian filter includes a 4 tap Gaussian filter based on a determination that at least one of the width of the block and the height of the block are not greater than the first threshold.

Aspect 65: The apparatus of Aspect 58, wherein the at least one processor is configured to, based at least in part on a determination that the determined minimum offset is not greater than the second threshold: use an interpolation filter as the determined type of smoothing filter, wherein the interpolation filter includes a 4 tap cubic filter; and perform intra-prediction for the block of video data using the interpolation filter without applying reference pixel smoothing.

Aspect 66: The apparatus of Aspect 58, wherein the at least one processor is configured to: determine a low-pass filter as the type of smoothing filter based at least in part on a determination that the intra-prediction mode is an integer angled mode and a determination that the determined minimum offset is greater than the second threshold.

Aspect 67: The apparatus of any of Aspect 67, wherein the at least one processor is configured to: perform reference pixel smoothing using a large tap low-pass filter based at least in part on a determination that at least one of the width of the block and the height of the block is greater than the first threshold, wherein the large tap low-pass filter applies a greater degree of reference pixel smoothing than a small tap low-pass filter.

Aspect 68: The apparatus of Aspect 67, wherein the at least one processor is configured to: perform reference pixel smoothing using a small tap low-pass filter based at least in part on a determination that at least one of the width of the block and the height of the block is not greater than the first threshold, wherein the small tap low-pass filter applies a lesser degree of reference pixel smoothing than a large tap low-pass filter.

Aspect 69: The apparatus of any of Aspects 53 to 68, wherein the at least one processor is configured to: determine that the intra-prediction mode is an integer-angled mode based at least in part on comparing a slope of the intra-prediction mode to one or more pixel positions determined from the width of the block and the height of the block.

Aspect 70: The apparatus of any of Aspects 53 to 69, wherein the at least one processor is configured to: determine that an offset between an angular direction of the intra-prediction mode and a vertical intra-prediction mode or a horizontal intra-prediction mode is less than a second threshold; and perform intra-prediction for the block of video data using a cubic interpolation filter based on determining that the offset between the angular direction of the intra-prediction mode and the vertical intra-prediction mode or the horizontal intra-prediction mode is less than the second threshold.

Aspect 71: The apparatus of Aspect 70, wherein the at least one processor is configured to perform reference line extension using a weak interpolation filter, wherein: the weak interpolation filter is used to perform the reference line extension prior to use of the cubic interpolation filter to perform intra-prediction; and the cubic interpolation filter has a higher cutoff frequency than the weak interpolation filter and applies a greater degree of smoothing than the weak interpolation filter.

Aspect 72: The apparatus of Aspect 71, wherein the weak interpolation filter includes a 4 tap sinc-based interpolation filter and a 6-bit 4 tap interpolation filter.

Aspect 73: The apparatus of any of Aspects 53 to 72, wherein the type of smoothing filter is signaled in a video bitstream.

Aspect 74: The apparatus of any of Aspects 53 to 73, wherein the type of smoothing filter is signaled for individual ones of a set of prediction blocks, coding blocks, coding tree units (CTUs), slices, or sequences.

Aspect 75: The apparatus of any of Aspects 53 to 74, wherein the at least one processor is configured to: determine the type of smoothing filter based on at least one of the width and the height of the block without using information explicitly signaled in a video bitstream.

Aspect 76: The apparatus of any of Aspects 53 to 75, wherein the at least one processor is configured to: determine a block of residual data for the block of video data; and decode the block of video data using the block of residual data and a predictive block determined based on performing the intra-prediction for the block of video data.

Aspect 77: The apparatus of any of Aspects 53 to 75, wherein the at least one processor is configured to: generate an encoded video bitstream including information associated with the block of video data.

Aspect 78: The apparatus of Aspect 77, further comprising: cause the encoded video bitstream to be stored in the at least one memory.

Aspect 79: The apparatus of any of Aspects 77 or 78, further comprising: a transmitter configured to transmit the encoded video bitstream.

Aspect 80: A method of processing video data, the method comprising: determining an intra-prediction mode for predicting a block of video data; determining a type of smoothing filter to use for the block of video data, wherein the type of the smoothing filter is determined based at least in part on comparing at least one of a width of the block of video data and a height of the block of video data to a first threshold; and performing intra-prediction for the block of video data using the determined type of smoothing filter and the intra-prediction mode.

Aspect 81: The method of Aspect 80, further comprising: using a first smoothing interpolation filter as the determined type of smoothing filter based at least in part on a determination that at least one of the width of the block and the height of the block is greater than the first threshold; and determining, using the first smoothing interpolation filter, a reference pixel for intra-prediction of the block of video data.

Aspect 82: The method of Aspect 81, wherein the first smoothing interpolation filter includes a 6 tap Gaussian filter.

Aspect 83: The method of any of Aspects 80 to 82, further comprising: using a second smoothing interpolation filter as the determined type of smoothing filter based at least in part on a determination that at least one of the width of the block and the height of the block is not greater than the first threshold; and determining, using the second smoothing interpolation filter, a reference pixel for intra-prediction of the block of video data.

Aspect 84: The method of Aspect 83, wherein the second smoothing interpolation filter includes a 4 tap Gaussian filter.

Aspect 85: The method of any of Aspects 80 to 84, further comprising: determining a minimum offset between an angular direction of the intra-prediction mode and one of a vertical intra-prediction mode and a horizontal intra-prediction mode; and determining the type of smoothing filter to use for the block of video data based on comparing the determined minimum offset to a second threshold.

Aspect 86: The method of Aspect 85, further comprising: determining a low-pass filter as the type of smoothing filter based at least in part on a determination that the determined minimum offset is greater than the second threshold and a determination that the intra-prediction mode is an integer angled mode associated with an integer-valued reference pixel position.

Aspect 87: The method of Aspect 86, wherein the low-pass filter performs reference pixel smoothing without interpolation, wherein the low-pass filter includes a [1 2 1] filter.

Aspect 88: The method of Aspect 85, further comprising: determining a Gaussian filter as the type of smoothing filter based at least in part on a determination that the determined minimum offset is greater than the second threshold and a determination that the intra-prediction mode is a fractional angled mode associated with a fractional-valued reference pixel position.

Aspect 89: The method of Aspect 88, wherein the Gaussian filter performs smoothing interpolation without reference pixel smoothing.

Aspect 90: The method of Aspect 88, wherein the Gaussian filter includes a 6 tap Gaussian filter based on a determination that at least one of the width of the block and the height of the block are greater than the first threshold.

Aspect 91: The method of Aspect 88, wherein the Gaussian filter includes a 4 tap Gaussian filter based on a determination that at least one of the width of the block and the height of the block are not greater than the first threshold.

Aspect 92: The method of Aspect 85, further comprising, based at least in part on a determination that the determined minimum offset is not greater than the second threshold: using an interpolation filter as the determined type of smoothing filter, wherein the interpolation filter includes a 4 tap cubic filter; and performing intra-prediction for the block of video data using the interpolation filter without applying reference pixel smoothing.

Aspect 93: The method of Aspect 85, further comprising determining a low-pass filter as the type of smoothing filter based at least in part on a determination that the intra-prediction mode is an integer angled mode and a determination that the determined minimum offset between the intra-prediction mode and the horizontal or vertical modes is greater than the second threshold.

Aspect 94: The method of Aspect 93, further comprising: applying reference pixel smoothing using a large tap low-pass filter based at least in part on a determination that at least one of the width of the block and the height of the block is greater than the first threshold, wherein the large tap low-pass filter applies a greater degree of reference pixel smoothing than a small tap low-pass filter.

Aspect 95: The method of Aspect 93, further comprising: applying reference pixel smoothing using a small tap low-pass filter based at least in part on a determination that at least one of the width of the block and the height of the block is not greater than the first threshold, wherein the small tap low-pass filter applies a lesser degree of reference pixel smoothing than a large tap low-pass filter.

Aspect 96: The method of any of Aspects 80 to 95, further comprising determining that the intra-prediction mode is an integer-angled mode based at least in part on comparing a slope of the intra-prediction mode to one or more pixel positions determined from the width of the block and the height of the block.

Aspect 97: The method of any of Aspects 80 to 96, further comprising: determining that an offset between an angular direction of the intra-prediction mode and a vertical intra-prediction mode or a horizontal intra-prediction mode is less than a second threshold; and performing intra-prediction for the block of video data using a cubic interpolation filter based on determining that the determined offset is less than the second threshold.

Aspect 98: The method of Aspect 97, further comprising performing reference line extension using a weak interpolation filter, wherein: the weak interpolation filter is used to perform the reference line extension prior to use of the cubic interpolation filter to perform intra-prediction; and the cubic interpolation filter has a higher cutoff frequency than the weak interpolation filter and applies a greater degree of smoothing than the weak interpolation filter.

Aspect 99: The method of Aspect 98, wherein the weak interpolation filter includes a 4 tap sinc-based interpolation filter and a 6-bit 4 tap interpolation filter.

Aspect 100: The method of any of Aspects 80 to 99, wherein the type of smoothing filter is signaled in a video bitstream.

Aspect 101: The method of any of Aspects 80 to 100, wherein the type of smoothing filter is signaled for individual ones of a set of prediction blocks, coding blocks, coding tree units (CTUs), slices, or sequences.

Aspect 102: The method of any of Aspects 80 to 101, further comprising determining the type of smoothing filter based on at least one of the width and the height of the block without using information explicitly signaled in a video bitstream.

Aspect 103: The method of any of Aspects 80 to 102, further comprising: determining a block of residual data for the block of video data; and decoding the block of video data using the block of residual data and a predictive block determined based on performing the intra-prediction for the block of video data.

Aspect 104: The method of any of Aspects 80 to 102, further comprising: generating an encoded video bitstream including information associated with the block of video data.

Aspect 105: The method of Aspect 104, further comprising: storing the encoded video bitstream.

Aspect 106: The method of any of Aspects 104 or 105, further comprising: transmitting the encoded video bitstream.

Aspect 107: A computer readable medium having stored thereon instructions that when executed by a processor perform the methods of any of aspects 53 to 106.

Aspect 108: An apparatus comprising means for performing the operations of any of aspects 53 to 106.

What is claimed is:

1. An apparatus for processing video data, comprising:
   at least one memory; and
   at least one processor coupled to the at least one memory and configured to:
   determine a non-integer angled intra-prediction mode for predicting a block of video data;
   for the non-integer angled intra-prediction mode, select between a first Gaussian smoothing interpolation filter and a second Gaussian smoothing interpolation filter to use for the block of video data, wherein the first Gaussian smoothing interpolation filter comprises more filter taps than the second Gaussian smoothing interpolation filter, wherein the selection is based at least in part on comparing at least one of a width of the block of video data and a height of the block of video data to a first threshold; and
   for the non-integer angled intra-prediction mode, perform intra-prediction for the block of video data using the selected smoothing interpolation filter and the intra-prediction mode.

2. The apparatus of claim 1, wherein, for the non-integer angled intra-prediction mode, the at least one processor is configured to:
   use the first Gaussian smoothing interpolation filter as the selected smoothing interpolation filter based at least in part on a determination that at least one of the width of the block and the height of the block is greater than the first threshold; and
determine, using the first Gaussian smoothing interpolation filter, a reference pixel for intra-prediction of the block of video data.

3. The apparatus of claim 2, wherein the first Gaussian smoothing interpolation filter includes a 6 tap Gaussian filter.

4. The apparatus of claim 1, wherein, for the non-integer angled intra-prediction mode, the at least one processor is configured to:
   use the second Gaussian smoothing interpolation filter as the selected smoothing interpolation filter based at least in part on a determination that at least one of the width of the block and the height of the block is not greater than the first threshold; and
   determine, using the second Gaussian smoothing interpolation filter, a reference pixel for intra-prediction of the block of video data.

5. The apparatus of claim 4, wherein the second Gaussian smoothing interpolation filter includes a 4 tap Gaussian filter.

6. The apparatus of claim 1, wherein the at least one processor is configured to:
   determine a block of residual data for the block of video data; and
   decode the block of video data using the block of residual data and a predictive block determined based on performing the intra-prediction for the block of video data.

7. The apparatus of claim 1, wherein the at least one processor is configured to:
   generate an encoded video bitstream including information associated with the block of video data.

8. The apparatus of claim 7, wherein the at least one processor is further configured to:
   cause the encoded video bitstream to be stored in the at least one memory.

9. The apparatus of claim 7, further comprising:
   a transmitter configured to transmit the encoded video bitstream.

10. A method of processing video data, the method comprising:
    determining a non-integer angled intra-prediction mode for predicting a block of video data;
    for the non-integer angled intra-prediction mode, select between a first Gaussian smoothing interpolation filter and a second Gaussian smoothing interpolation filter to use for the block of video data, wherein the first Gaussian smoothing interpolation filter comprises more filter taps than the second Gaussian smoothing interpolation filter, wherein the selecting is based at least in part on comparing at least one of a width of the block of video data and a height of the block of video data to a first threshold; and
    for the non-integer angled intra-prediction mode, performing intra-prediction for the block of video data using the selected smoothing interpolation filter and the intra-prediction mode.

11. The method of claim 10, for the non-integer angled intra-prediction mode further comprising:
    using the first Gaussian smoothing interpolation filter as the determined type of smoothing filter based at least in part on a determination that at least one of the width of the block and the height of the block is greater than the first threshold; and
determining, using the first Gaussian smoothing interpolation filter, a reference pixel for intra-prediction of the block of video data.

12. The method of claim 11, wherein the first Gaussian smoothing interpolation filter includes a 6 tap Gaussian filter.

13. The method of claim 10, for the non-integer angled intra-prediction mode further comprising:
    using the second Gaussian smoothing interpolation filter as the selected smoothing interpolation filter based at least in part on a determination that at least one of the width of the block and the height of the block is not greater than the first threshold; and
determining, using the second Gaussian smoothing interpolation filter, a reference pixel for intra-prediction of the block of video data.

14. The method of claim 13, wherein the second Gaussian smoothing interpolation filter includes a 4 tap Gaussian filter.

15. The method of claim 10, further comprising:
    determining a block of residual data for the block of video data; and
    decoding the block of video data using the block of residual data and a predictive block determined based on performing the intra-prediction for the block of video data.

16. The method of claim 10, further comprising:
    generating an encoded video bitstream including information associated with the block of video data.

* * * * *